United States Patent
Kato et al.

(10) Patent No.: US 6,945,036 B2
(45) Date of Patent: Sep. 20, 2005

(54) EXHAUST EMISSION CONTROL FILTER AND METHOD OF CONTROLLING EXHAUST EMISSION

(75) Inventors: Zenichiro Kato, Mishima (JP); Hiromichi Yanagihara, Gotemba (JP); Toshihisa Sugiyama, Gotemba (JP); Yoshimitsu Henda, Numazu (JP); Kazuhiko Shiratani, Susono (JP); Rentaro Kuroki, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 21 days.

(21) Appl. No.: 10/130,110

(22) PCT Filed: Sep. 18, 2001

(86) PCT No.: PCT/JP01/08114

§ 371 (c)(1),
(2), (4) Date: May 15, 2002

(87) PCT Pub. No.: WO02/25072

PCT Pub. Date: Mar. 28, 2002

(65) Prior Publication Data

US 2002/0162325 A1 Nov. 7, 2002

(30) Foreign Application Priority Data

| Sep. 20, 2000 | (JP) | ................................. 2000-285920 |
| Sep. 29, 2000 | (JP) | ................................. 2000-300167 |
| Nov. 17, 2000 | (JP) | ................................. 2000-350587 |
| Jan. 22, 2001 | (JP) | ................................. 2001-12684 |
| Jun. 18, 2001 | (JP) | ................................. 2001-183517 |

(51) Int. Cl.[7] ............................................. F01N 3/00
(52) U.S. Cl. ............................ 60/297; 60/274; 60/295; 60/302; 60/311; 55/DIG. 30
(58) Field of Search .......................... 60/274, 295, 280, 60/297, 286, 300, 302, 303, 311; 55/DIG. 30

(56) References Cited

U.S. PATENT DOCUMENTS

| 4,866,932 A |   | 9/1989 | Morita et al. |
| 4,897,096 A | * | 1/1990 | Pischinger et al. ............ 60/311 |
| 5,121,601 A | * | 6/1992 | Kammel ....................... 60/275 |

(Continued)

FOREIGN PATENT DOCUMENTS

| DE | 37 11 101 A1 | 10/1987 |
| EP | 0 559 907 A1 | 9/1993 |
| EP | 0 766 993 A2 | 4/1997 |

(Continued)

*Primary Examiner*—Binh Q. Tran
(74) *Attorney, Agent, or Firm*—Oliff & Berridge, PLC

(57) ABSTRACT

Carbon-containing particulates like soot included in an exhaust gas of an internal combustion engine are collected by means of a heat-resistant filter medium. The filter medium dispersedly collects hydrocarbon compounds and the carbon-containing particulates included in the exhaust gas. Even when the exhaust gas has a lower temperature than the combustible temperature of the carbon-containing particulates, such dispersed collection ensures start of a preliminary oxidation reaction of the collected hydrocarbon compounds with oxygen included in the exhaust gas. The collected hydrocarbon compounds and the collected carbon-containing particulates are then subjected to combustion with the exhaust gas having a filter inflow temperature lower than the combustible temperature of the carbon-containing particulates by utilizing the reaction heat and active species produced by the reaction. This technique thus simply but securely regulates and reduces the carbon-containing particulates included in the exhaust gas.

27 Claims, 22 Drawing Sheets

U.S. PATENT DOCUMENTS

| | | | |
|---|---|---|---|
| 5,258,164 A * | 11/1993 | Bloom et al. | 60/311 |
| 5,457,945 A * | 10/1995 | Adiletta | 55/301 |
| 5,682,740 A * | 11/1997 | Kawamura | 60/297 |
| 5,820,833 A * | 10/1998 | Kawamura | 60/311 |
| 5,851,249 A | 12/1998 | Henda et al. | |
| 5,863,311 A * | 1/1999 | Nagai et al. | 55/483 |
| 5,908,480 A | 6/1999 | Ban et al. | |
| 5,930,995 A * | 8/1999 | Watanabe et al. | 60/311 |
| 5,941,066 A | 8/1999 | Araki et al. | |
| 6,167,696 B1 * | 1/2001 | Maaseidvaag et al. | 60/274 |
| 6,546,721 B2 * | 4/2003 | Hirota et al. | 60/297 |

FOREIGN PATENT DOCUMENTS

| | | |
|---|---|---|
| EP | 0 798 452 A1 | 10/1997 |
| EP | 0 806 553 A2 | 11/1997 |
| EP | 0 823 545 A1 | 2/1998 |
| EP | 0 894 950 A2 | 2/1999 |
| JP | A 2-108806 | 4/1990 |
| JP | A 6-185337 | 7/1994 |
| JP | A 7-106290 | 4/1995 |
| JP | B2 7-106290 | 11/1995 |
| JP | A 9-268910 | 10/1997 |
| JP | A 10-47035 | 2/1998 |
| JP | A 11-294139 | 10/1999 |
| JP | A 2000-161044 | 6/2000 |

* cited by examiner

|  | MEAN FIBER DIAMETER | MEAN PORE DIAMETER | THICKNESS OF NON-WOVEN FABRIC |
|---|---|---|---|
| NON-WOVEN FABRIC A | 15 μm | 11 μm | 0.5mm |
| NON-WOVEN FABRIC B | 20 μm | 13 μm | 0.5mm |

Fig.20

| MEAN PORE DIAMETER | ON DELIVERY | AFTER DURATION |
|---|---|---|
| 10 μm | ◎ | BREAKDOWN (BLOCK ON SURFACE OF INLET) |
| 12 μm | ◎ | ◎ |
| 14 μm | ◎ | BREAKDOWN (BLOCK ON SURFACE OF OUTLET) |

EXHAUST GAS

EXHAUST GAS

EXHAUST GAS

EXHAUST GAS

EXHAUST GAS

EXHAUST EMISSION CONTROL FILTER AND METHOD OF CONTROLLING EXHAUST EMISSION

TECHNICAL FIELD

The present invention relates to a technique of regulating and reducing carbon-containing particulates included in exhaust gases from an internal combustion engine.

BACKGROUND ART

The exhaust gas from Diesel engines includes carbon-containing particulates like black smoke (soot), and there is a high demand of reducing the total emission of the carbon-containing particulates, in order to prevent further air pollution. There is a similar demand in direct injection gasoline engines where gasoline is directly injected into a combustion chamber, since the carbon-containing particulates may be discharged with the exhaust gas under some driving conditions.

One proposed technique of remarkably reducing the carbon-containing particulates in the emission from an internal combustion engine disposes a heat-resistant filter in an exhaust conduit of the internal combustion engine and uses the filter to collect the carbon-containing particulates included in the exhaust gas.

The particulates are mainly composed of carbon, but should be exposed to high temperatures of not lower than 550° C. in the exhaust gas containing oxygen for their combustion. As long as the internal combustion engine, such as the Diesel engine or the direct injection gasoline engine, is driven under ordinary conditions, the temperature of the exhaust gas flown into the filter hardly exceeds the temperature of 550° C. It is accordingly required to process the collected particulates by some technique. Otherwise the filter is clogged to cause various troubles, for example, a decrease in output of the internal combustion engine.

A diversity of techniques have been proposed to process the carbon-containing particulates collected by the filter. One simple technique makes a noble metal catalyst, such as platinum, carried on the filter and utilizes the catalytic action for combustion of the collected particulates in the exhaust gas of a relatively low temperature (see JAPANESE PATENT PUBLICATION GAZETTE No. 7-106290). Another proposed technique intentionally raises the temperature of the exhaust gas for combustion of the collected carbon-containing particulates on the filter (see JAPANESE PATENT LAID-OPEN GAZETTE No. 2000-161044). There are a variety of methods applicable to raise the temperature of the exhaust gas. One applicable method called the intake reduction technique sets an on-off valve in an intake conduit of the internal combustion engine and narrows the opening of the valve to increase the temperature of the exhaust gas. Another applicable method delays the injection timing of the fuel from the appropriate timing to increase the temperature of the exhaust gas.

These prior art techniques, however, have some drawbacks discussed below. The catalyst in use naturally deteriorates its performance. The long-term use of the catalyst thus makes it difficult to completely process the collected carbon-containing particulates and eventually leads to clogging of the filter. Increasing the load of the noble metal on the filter certainly prevents the significant deterioration of the catalyst, but it is not desirable to increase the load of the precious noble metal.

The technique of intentionally raising the temperature of the exhaust gas causes the chemical energy of the fuel not to be converted to the output of the internal combustion engine but to be released as heat. This undesirably lowers the output of the internal combustion engine or the fuel consumption rate.

The object of the present invention is thus to solve the drawbacks of the prior art techniques discussed above and to provide a technique of easily and securely regulating and reducing carbon-containing particulates included in the exhaust gas of an internal combustion engine over a long time period without worsening the performances of the internal combustion engine.

DISCLOSURE OF THE INVENTION

At least part of the above and other related objects is attained by an emission filter of the present invention for regulating and reducing carbon-containing particulates included in an exhaust gas from an internal combustion engine. The emission filter has a heat-resistant filter medium that collects hydrocarbon compounds and the carbon-containing particulates included in the exhaust gas in a dispersive manner to bring the respective particulates and hydrocarbon compounds in contact with oxygen included in the exhaust gas, and thereby makes the collected hydrocarbon compounds and the collected carbon-containing particulates subjected to combustion with the exhaust gas having a filter inflow temperature lower than a combustible temperature of the carbon-containing particulates.

There is an emission control method corresponding to the emission filter discussed above.

The present invention is accordingly directed to an emission control method that regulates and reduces carbon-containing particulates included in an exhaust gas of an internal combustion engine. The emission control method includes the steps of: utilizing a heat-resistant filter medium to collect hydrocarbon compounds and the carbon-containing particulates included in the exhaust gas in a dispersive manner to bring the respective particulates and hydrocarbon compounds in contact with oxygen included in the exhaust gas; and making the collected hydrocarbon compounds and the collected carbon-containing particulates subjected to combustion with the exhaust gas having a filter inflow temperature lower than a combustible temperature of the carbon-containing particulates, so as to regulate and reduce the carbon-containing particulates.

In the emission filter and the corresponding emission control method of the present invention, the carbon-containing particulates included in the exhaust gas from the internal combustion engine are collected by the heat-resistant filter medium, together with the hydrocarbon compounds in the exhaust gas. The carbon-containing particulates represent any particulates containing carbon, such as soot. The hydrocarbon compounds are non-combusted organic compounds attributed to the fuel or lubricant oil. The carbon-containing particulates and the hydrocarbon compounds are dispersedly collected in the filter medium. A large portion of the collected particulates and hydrocarbon compounds is kept in a specific state that brings the respective particulates and hydrocarbon compounds in contact with oxygen included in the exhaust gas. Even when the temperature of the exhaust gas flown into the filter is lower than the combustible temperature of the carbon-containing particulates, a gentle exothermic reaction proceeds between the collected hydrocarbon compounds and oxygen. This eventually leads to combustion of the collected hydrocarbon compounds and the collected carbon-containing particulates. This technique thus securely and easily reduces the carbon-containing particulates included in the exhaust gas over a long time period.

The present invention has been completed, based on the findings of unique phenomena. In order to clearly explain the functions and the effects of the present invention, the unique phenomena found by the inventors are discussed briefly.

FIG. 27 conceptually shows the unique phenomena found by the inventors. FIG. 27(a) conceptually illustrates an experimental apparatus, where a filter E is disposed in an exhaust conduit of an internal combustion engine A (typically a Diesel engine). The internal combustion engine A intakes the air from an intake conduit B, makes a fuel subjected to combustion inside a combustion chamber C, and discharges the exhaust gas through an exhaust conduit D. The exhaust gas includes carbon-containing particulates like soot and hydrocarbon compounds, which are collected by the filter E disposed in the exhaust conduit D. The filter E is capable of dispersedly collecting the carbon-containing particulates and the hydrocarbon compounds as discussed later in detail. Measurable factors are a temperature Tg of the exhaust gas flown into the filter E, a temperature Tf of the filter E, and a differential pressure $\Delta P$ before and after the filter E.

The graph of FIG. 27(b) shows variations in differential pressure $\Delta P$ before and after the filter, in temperature Tg of the exhaust gas in the upstream of the filter, and in filter temperature Tf when a new replacement of the filter E is set in the exhaust conduit D and the internal combustion engine A is driven in fixed conditions. In response to a start of the operation of the internal combustion engine A, the temperature Tg of the exhaust gas and the filter temperature Tf immediately rise from room temperature to a steady temperature. In the actual state, the filter temperature Tf is higher than the temperature Tg of the exhaust gas. One of the unique phenomena found by the inventors is that the filter temperature Tf becomes higher than the temperature Tg of the exhaust gas when the exhaust gas passes through the filter. This phenomenon will be discussed in detail later. For simplicity of explanation, here it is assumed that there is no significant difference between the filter temperature Tf and the temperature Tg of the exhaust gas. The steady temperature, which the temperature Tg of the exhaust gas and the filter temperature Tf reaches after the start of the operation of the internal combustion engine A, is affected by the driving conditions of the internal combustion engine A and a diversity of other factors. The steady temperature is typically in a range of 250° C. to 350° C.

The differential pressure before and after the filter gradually increases even after the temperature reaches the steady state, but soon becomes plateau and is substantially stabilized as shown in FIG. 27(b). The value of the stabilized differential pressure is varied mainly by the design dimensions of the filter, but is typically three to four times of the initial differential pressure. For convenience of explanation, the term from the start of the operation of the internal combustion engine to the stabilization of the differential pressure before and after the filter is called the 'first term'.

When the internal combustion engine continues driving after stabilization of the differential pressure before and after the filter, the filter temperature Tf starts a gentle rise, whereas the temperature Tg of the exhaust gas flown into the filter is not significantly varied. With continuance of the operation of the internal combustion engine, the deviation of the filter temperature Tf from the temperature Tg of the exhaust gas gradually increases. The filter temperature Tf eventually reaches about 550° C. The differential pressure $\Delta P$ before and after the filter tends to slightly increase, due to collection of the carbon-containing particulates like soot and the hydrocarbon compounds by the filter E, although the level of increase may be insignificant.

When the filter temperature Tf rises to 550° C., the soot and the other particulates collected by the filter E starts combustion. The filter temperature Tf once exceeds 550° C. but is soon lowered to a temperature close to the temperature Tg of the exhaust gas. This suggests that combustion of soot should be completed in a relatively short time. In the case where the increase in differential pressure $\Delta P$ before and after the filter, due to collection of soot and the other particulates in the exhaust gas, is detectable, a decrease in differential pressure $\Delta P$, due to combustion of the soot and the other particulates collected by the filter E, is also detectable. For convenience of explanation, the term subsequent to the first term when the filter temperature Tf gradually becomes apart from the temperature Tg of the exhaust gas and is again dropped to the temperature Tg of the exhaust gas is called the 'second term'. The first term is appreciably shorter than the second term. For clarity of illustration, the first term illustrated in FIG. 27 is longer than the actual length relative to the second term.

The filter temperature Tf is lowered to the temperature Tg of the exhaust gas on completion of combustion of the soot and the other particulates collected by the filter E, but again rises to 550° C. to start combustion of the collected soot. Namely the filter E is kept in the state of the second term to repeat collection and combustion of the soot and the other particulates included in the exhaust gas.

The graph of FIG. 27(c) shows variations in filter temperature Tf and in differential pressure $\Delta P$ before and after the filter when the driving conditions of the internal combustion engine A are changed from the conditions of FIG. 27(b) to slightly raise the temperature of the exhaust gas flown into the filter E (typically by about 50° C.). Similar results are obtained when the driving conditions are changed from the conditions of FIG. 27(b) to slightly raise the density of the soot or the density of the hydrocarbon compounds, instead of the temperature of the exhaust gas.

As shown in FIG. 27(c), in the case of the little higher temperature of the exhaust gas flown into the filter E, the filter temperature Tf also gradually becomes apart from the temperature Tg of the exhaust gas in the second term and eventually reaches 550° C. to start combustion of the collected soot. Under the conditions of FIG. 27(c), since the temperature Tg of the exhaust gas flown into the filter E is a little higher than that under the conditions of FIG. 27(b), the filter temperature Tf reaches 550° C. in a shorter time period. Combustion of the collected soot is completed in a relatively short time and the filter temperature Tf starts decreasing under the conditions of FIG. 27(c). Unlike the case of FIG. 27(b), however, the decreasing filter temperature Tf becomes plateau at temperature higher than the temperature Tg of the exhaust gas. The term subsequent to the second term when the filter temperature Tf becomes plateau at the temperature higher than the temperature Tg of the exhaust gas is called the 'third term'. It is thought that the temperature difference between the temperature Tg of the exhaust gas and the filter temperature Tf in the third term depends upon the driving conditions of the internal combustion engine A. The phenomenon occurring in the third term has not yet been elucidated, but it is expected that collection and combustion of the soot and the other particulates are locally repeated or that collection and combustion simultaneously proceed at an identical place. Anyhow the differential pressure ΔP before and after the filter is kept at a substantially constant value in the third term, as shown in FIG. 27(c).

As described above, the inventors of the present application have found the phenomenon that dispersed collection of the carbon-containing particulates and the hydrocarbon compounds included in the exhaust gas from the internal combustion engine to bring the respective particulates and hydrocarbon compounds in contact with oxygen in the exhaust gas ensures combustion of the collected carbon-containing particulates with the exhaust gas having the lower filter inflow temperature than the combustible temperature of the carbon-containing particulates. The details of the test and the estimated mechanism of utilizing the low-temperature exhaust gas for combustion of the carbon-containing particulates will be discussed later.

The emission filter of the present invention and the corresponding emission control method utilize this phenomenon for combustion of the carbon-containing particulates collected by the filter medium. Unlike the prior art method of utilizing a catalyst for combustion of the collected carbon-containing particulates and the method of intentionally raising the temperature of the exhaust gas for combustion of the carbon-containing particulates, the technique of the present invention securely and readily regulates and reduces the carbon-containing particulates in the exhaust gas without making the filter clogged or deteriorating the performances of the engine. The specific function of the emission filter of the present invention that utilizes the above phenomenon for combustion of the collected carbon-containing particulates may be referred to as the 'spontaneous regenerating function' in the specification hereof.

In accordance with one preferable application, heat of reaction of the hydrocarbon compounds collected by the heat-resistant filter medium with oxygen included in the exhaust gas is utilized to make the collected carbon-containing particulates subjected to combustion. The hydrocarbon compounds react with oxygen even in the exhaust gas of low temperature that does not cause combustion of the carbon-containing particulates. The arrangement of utilizing the heat of reaction of the hydrocarbon compounds with oxygen to raise the temperature of the heat-resistant filter medium accordingly ensures combustion of the collected carbon-containing particulates with the exhaust gas having the lower filter inflow temperature than the combustible temperature of the carbon-containing particulates.

In the emission filter of the above application, it is preferable that the heat-resistant filter medium utilizes active species produced by the reaction of the collected hydrocarbon compounds with oxygen included in the exhaust gas, in addition to the heat of the reaction, so as to make the collected carbon-containing particulates subjected to combustion. The presence of such active species generally tends to accelerate the oxidation reaction. The temperature of the heat-resistant filter medium is raised by the heat of the reaction of the collected hydrocarbon compounds with oxygen. The active species produced through this reaction is further utilized to ensure combustion of the collected carbon-containing particulates.

In the emission filter, the heat-resistant filter medium may trap the carbon-containing particulates and the hydrocarbon compounds therein. It is rather difficult to dispersedly collect the carbon-containing particulates and the hydrocarbon compounds mainly on the surface of the filter medium. Trapping the carbon-containing particulates and the hydrocarbon compounds inside the filter medium, on the other hand, facilitates dispersed collection thereof.

In the emission filter that traps the carbon-containing particulates and the hydrocarbon compounds therein, it is preferable that the heat-resistant filter medium utilizes a variation in pressure of the exhaust gas from the internal combustion engine to dispersedly collect the carbon-containing particulates and the hydrocarbon compounds. Application of the pressure variation of the exhaust gas to the carbon-containing particulates and the hydrocarbon compounds enables the carbon-containing particulates and the hydrocarbon compounds to be readily dispersed in and collected by the heat-resistant filter medium.

In accordance with another preferable application of the emission filter, the heat-resistant filter medium converts fluidization energy of the exhaust gas from the internal combustion engine into heat, so as to raise the own temperature of the heat-resistant filter medium. The increased temperature of the filter medium preferably facilitates combustion of the collected carbon-containing particulates and the collected hydrocarbon compounds even when the temperature of the exhaust gas flown into the filter is lower than the combustible temperature of the carbon-containing particulates.

In the emission filter of the above application, it is preferable that the heat-resistant filter medium is heated by utilizing a temperature rise in the process of compressing the exhaust gas by means of a dynamic pressure. The dynamic pressure of the exhaust gas is effectively utilized to readily raise the temperature of the heat-resistant filter medium and thereby ensure combustion of the collected carbon-containing particulates.

In accordance with still another preferable application of the emission filter, the heat-resistant filter medium has multiple pathways, which connect with one another in a three dimensional manner inside the filter medium and are open to surface of the filter medium. The heat-resistant filter medium having such multiple pathways preferably enables the carbon-containing particulates and the hydrocarbon compounds in the exhaust gas to be dispersed in and collected by the filter medium.

The multiple pathways formed inside the heat-resistant filter medium may have a mean inner diameter in a range of about 11 $\mu$m to about 13 $\mu$m. When the multiple pathways formed inside the filter medium have the mean inner diameter of less than 11 $\mu$m, the surface of the filter medium on the inflow side of the exhaust gas is often clogged. The mean inner diameter of greater than 13 $\mu$m, on the other hand, often causes the surface of the filter medium on the outflow side of the exhaust gas to be clogged. Setting the mean inner diameter of the multiple pathways formed inside the filter medium in the range of about 11 $\mu$m to about 13 $\mu$m enables the carbon-containing particulates and the hydrocarbon compounds in the exhaust gas to be dispersed in and collected by the filter medium without making the filter medium clogged. In the specification hereof, the mean inner diameter represents the mean pore diameter measured according to the Washburn's Equation. Namely the mean inner diameter is the pore diameter having the accumulated pore volume of 50%. The numerical value of the mean inner diameter is varied in measurement of another known method.

A non-woven fabric made of heat-resistant fibers having a mean fiber diameter in a range of about 15 $\mu$m to about 20 $\mu$m is applicable for the heat-resistant filter medium. It has been empirically found that the mean inner diameter of pathways formed inside the non-woven fabric is somewhat correlated with the mean diameter of the fibers consisting of the non-woven fabric. The fibers having the mean diameter of about 15 μm to about 20 μm readily give the non-woven fabric having the mean inner diameter of about 11 μm to about 13 μm. The fiber density (the number of fibers per unit volume of the non-woven fabric) tends to be lowered with an increase in mean inner diameter of the pathways formed inside the non-woven fabric. In order to compensate for a decrease in strength of the non-woven fabric due to the lowered fiber density, the heat-resistant fibers having the mean fiber diameter in the range of about 15 μm to about 20 μm are preferably used to make the non-woven fabric having the mean inner diameter in the range of about 11 μm to about 13 μm.

In the case where the non-woven fabric is applied for the heat-resistant filter medium, the non-woven fabric preferably has a thickness in a range of about 0.3 mm to about 1.0 mm or more preferably has a thickness in a range of about 0.4 mm to about 0.5 mm. The thinner non-woven fabric does not have sufficient strength and is easily broken. The excessively thick non-woven fabric is, on the other hand, not readily bent and thus makes it difficult to manufacture a relatively compact emission filter. Application of the non-woven fabric having the thickness of about 0.3 mm to about 1.0 mm or more preferably the thickness of about 0.4 mm to about 0.5 mm for the heat-resistant filter medium facilitates manufacture of a relatively compact emission filter, while ensuring the practically sufficient strength of the filter medium.

In the emission filter using the filter medium including the multiple pathways that connect with one another in the three dimensional manner, the heat-resistant filter medium may change over a flow path of the exhaust gas flowing through the multiple pathways in the course of collecting the carbon-containing particulates and the hydrocarbon compounds. The structure of changing over the flow path of the exhaust gas enables the carbon-containing particulates and the hydrocarbon compounds to be collected dispersedly in the heat-resistant filter medium. Change-over the flow of the exhaust gas to a new flow path in the course of collection preferably suppresses an increase in pressure loss when the exhaust gas passes through the filter medium.

In the emission filter of the above structure, the heat-resistant filter medium may change over the flow path of the exhaust gas flowing through the multiple pathways when a pressure loss in the course of the collection reaches three to four times of an initial value. After the pressure loss increases to three or four times of the initial value due to collection of the carbon-containing particulates and the hydrocarbon compounds in the exhaust gas by the filter medium, the rate of increase in pressure loss tends to be heightened. This arrangement, which changes over the flow path of the exhaust gas passing through the filter medium when the pressure loss reaches the three or four times of the initial value, desirably suppresses the increase in pressure loss.

In one preferable application, the emission control method discussed above further includes the step of leading a supply of oxygen from the upstream of the heat-resistant filter medium into the exhaust gas. The supply of oxygen to the exhaust gas desirably accelerates the reaction of the hydrocarbon compounds collected on the filter medium with oxygen or accelerates the combustion of the collected carbon-containing particulates with oxygen.

In another preferable application, the emission control method further includes the step of arranging a NOx reduction catalyst in downstream of the heat-resistant filter medium to diminish nitrogen oxides included in the exhaust gas. This arrangement desirably reduces both the carbon-containing particulates and the nitrogen oxides included in the exhaust gas.

In the emission control method of the above application, the NOx reduction catalyst may be a catalyst that absorbs the nitrogen oxides under a condition that excess oxygen is present in the exhaust gas, and reduces the absorbed nitrogen oxides with a decrease in concentration of oxygen in the exhaust gas. The NOx reduction catalyst that once absorbs and then reduces the nitrogen oxides included in the exhaust gas efficiently diminishes the nitrogen oxides in the exhaust gas. This arrangement thus efficiently reduces both the carbon-containing particulates and the nitrogen oxides included in the exhaust gas.

The technique of the present invention is not restricted to the emission filter, but is attained by an emission control device with the emission filter discussed above.

The present invention is accordingly directed to an emission control device that is applied to an internal combustion engine to regulate and reduce carbon-containing particulates included in an exhaust gas. Here the internal combustion engine has a combustion chamber and an exhaust conduit for discharging the exhaust gas from the combustion chamber. The emission control device includes: an emission filter that is attached to the exhaust conduit to collect the carbon-containing particulates included in the exhaust gas; and a heat insulating section that is interposed between the emission filter and the exhaust conduit. The emission filter has a heat-resistant filter medium that collects hydrocarbon compounds and the carbon-containing particulates included in the exhaust gas in a dispersive manner to bring the respective particulates and hydrocarbon compounds in contact with oxygen included in the exhaust gas, and thereby makes the collected hydrocarbon compounds and the collected carbon-containing particulates subjected to combustion with the exhaust gas having a lower filter inflow temperature than a combustible temperature of the carbon-containing particulates.

There is also an emission control method corresponding to the emission control device.

The present invention is thus directed to an emission control method that is applied to an internal combustion engine to regulate and reduce carbon-containing particulates included in an exhaust gas. Here the internal combustion engine has a combustion chamber and an exhaust conduit for discharging the exhaust gas from the combustion chamber. The emission control method includes the steps of: disposing an emission filter, which has a heat-resistant filter medium, in the exhaust conduit in such a manner that a heat insulating section is formed between the emission filter and the exhaust conduit; utilizing the heat-resistant filter medium to collect hydrocarbon compounds and the carbon-containing particulates included in the exhaust gas in a dispersive manner to bring the respective particulates and hydrocarbon compounds in contact with oxygen included in the exhaust gas; and making the collected hydrocarbon compounds and the collected carbon-containing particulates subjected to combustion with the exhaust gas having a lower filter inflow temperature than a combustible temperature of the carbon-containing particulates, so as to regulate and reduce the carbon-containing particulates.

In the emission control device and the corresponding emission control method of the present invention, the filter is disposed in the exhaust conduit to dispersedly collect the carbon-containing particulates and the hydrocarbon compounds included in the exhaust gas. The heat insulating section is formed between the emission filter and the exhaust conduit. As described later, the inventors of the present application have newly found that the temperature of the emission filter rises when the flow of the exhaust gas passes through the filter. Formation of the heat insulating section between the emission filter and the exhaust conduit to prevent a release of heat to the exhaust conduit thus efficiently raises the temperature of the emission filter. The efficient rise in filter temperature ensures easy and secure combustion of the carbon-containing particulates and the hydrocarbon compounds collected on the filter.

The following describes the phenomenon that the filter temperature rises when the flow of the exhaust gas passes through the emission filter, with reference to FIG. 28. FIG. 28(a) conceptually illustrates an experimental apparatus. As in the case of FIG. 27, a filter E is disposed in an exhaust conduit of an internal combustion engine A (typically a Diesel engine). Measurable factors are the temperature Tg of the exhaust gas flown into the filter E and the filter temperature Tf.

The temperature Tg of the exhaust gas flown into the filter and the filter temperature Tf were measured with this experimental apparatus, while the driving conditions of the internal combustion engine A were varied. The measurement results showed that the filter temperature Tf was always higher than the temperature Tg of the exhaust gas. The temperature Tg of the inflow exhaust gas and an increase dT (=Tf−Tg) of the filter temperature Tf were measured by varying the temperature of the exhaust gas, while the other factors like the flow rate of the exhaust gas were practically fixed. FIG. 28(b) shows the results of the measurement.

As shown in FIG. 28(b), the increase dT of the filter temperature tends to be linearly heightened with a rise in temperature Tg of the inflow exhaust gas. Based on this result, the following mechanism is estimated for the phenomenon of making the filter temperature Tf higher than the temperature Tg of the inflow exhaust gas.

The filter E has a flow resistance and interferes with the flow of the exhaust gas having a large flow velocity, so that part of the flow velocity of the exhaust gas is converted into a pressure. This gives a pressure increase dP. According to the teach of thermodynamics, three variables, that is, pressure P, temperature T, and specific volume v always satisfy the following relation:

$$P \cdot v = R \cdot T \quad (1)$$

where R denotes the gas constant. When the flow of the exhaust gas is intercepted by the filter E to increase the pressure P by dP, the temperature of the exhaust gas increases by dT to satisfy Equation (1) given above. Namely this may be the mechanism of the phenomenon that the filter temperature Tf is always higher than the temperature Tg of the exhaust gas. The dynamic pressure works to make the filter compress the exhaust gas and thereby raise the temperature of the exhaust gas. The filter is heated with the exhaust gas of the raised temperature. The filter temperature Tf is thus kept higher than the temperature Tg of the inflow exhaust gas.

The validity of this estimated mechanism is confirmed, based on the measurement results shown in FIG. 28(b). Equation (1) is rewritten to:

$$Pg \cdot v = R \cdot Tg \quad (2)$$

where Pg denotes the pressure of the exhaust gas at the inlet of the filter E and Tg denotes the temperature of the exhaust gas at the inlet. When it is assumed that the filter E intercepts the flow of the exhaust gas to increase the pressure and the temperature by dP and dT, Equation (1) is rewritten as:

$$(Pg+dP) \cdot v = R \cdot (Tg+dT) \quad (3)$$

Equations (2) and (3) give:

$$dT = (Tg \cdot dP)/Pg \quad (4)$$

According to Equation (4), the temperature increase dT of the filter E is expected to be proportional to the temperature Tg of the exhaust gas flown into the filter. This is coincident with the measurement results shown in FIG. 28(b). Namely the measurement results of FIG. 28(b) prove the validity of the estimated mechanism described above. The phenomenon that the filter temperature Tf is always higher than the temperature Tg of the exhaust gas at the inlet of the filter is thus ascribed to compression of the exhaust gas and the resulting increase in temperature of the exhaust gas when the exhaust gas discharged from the internal combustion engine passes through the filter.

The increase in temperature Tg of the exhaust gas enhances the temperature increase dT as clearly understood from Equation (4). The increase in flow velocity of the exhaust gas flown into the filter enhances the pressure increase dP and thereby the temperature increase dT of the filter. In general, the temperature of the exhaust gas discharged from the internal combustion engine is lowered as the flow of the exhaust gas passes through the exhaust conduit. The exhaust gas is vigorously ejected from the internal combustion engine to form a pulse-like flow having a large flow velocity. As the flow of the exhaust gas passes through the exhaust conduit, the pulse-like flow is averaged to lower the flow velocity. The attachment position of the filter closer to the internal combustion engine raises the temperature and the flow velocity of the exhaust gas and accordingly enhances the temperature increase dT of the filter.

Based on such findings, in the emission control device of the present invention and the emission control method corresponding to the emission control device, a heat insulating section is formed between the exhaust conduit and the emission filter set in the exhaust conduit to intercept the flow of heat from the filter to the exhaust conduit. This arrangement ensures an efficient increase in temperature of the emission filter and easy and secure combustion of the carbon-containing particulates and the hydrocarbon compounds collected on the filter.

In the case where the emission control device is applied to an internal combustion engine, which includes a plurality of the combustion chambers and an exhaust manifold that unites flows of the exhaust gas from the plurality of combustion chambers to at least one exhaust pipe, one preferable embodiment sets the emission filter in the exhaust manifold. This locates the emission filter closer to the combustion chamber and enables the high-temperature exhaust gas to be flown into the filter at a high flow velocity, thus effectively increasing the temperature of the emission filter.

In one preferable embodiment of the emission control device, the heat insulating section is a space formed between the emission filter and the exhaust conduit. The space allows the inflow air to form an air layer or allows the inflow exhaust gas to form an exhaust gas layer, thus effectively insulating the filter from the exhaust conduit.

In the emission control device of this preferable embodiment, the heat insulating section may be a space between the emission filter and the exhaust conduit, which has one end open to a flow path of the exhaust gas and is narrowed at the opening. This arrangement enables the exhaust gas to be flown into the space through the opening to the flow path of he exhaust gas. The filter is accordingly heated with the hot exhaust gas immediately after the start of the internal combustion engine, so that the filter temperature is quickly raised. The flow of the exhaust gas is restricted at the narrowed opening and then enters the space. Such restriction desirably prevents the flow of the exhaust gas from being vigorously flown into the space to fluidize the exhaust gas existing inside the space. When the filter temperature becomes higher than the temperature of the exhaust gas, this arrangement prevents heat from being released from the filter to the exhaust conduit due to fluidization of the exhaust gas and thus effectively insulates the filter from the exhaust conduit.

In the emission control device of this preferable embodiment, the heat insulating section may be a space between the emission filter and the exhaust conduit, which has one end open to a flow path of the exhaust gas and has a thickness of not greater than 1 mm. In the case where the distance between the emission filter and the exhaust conduit is 1 mm or less, the existing exhaust gas does not vigorously fluidize inside the space. Setting the thickness of the space to be not greater than 1 mm thus allows the exhaust gas to be flown into the space through the opening and quickly raise the filter temperature at the time of starting the internal combustion engine. When the filter temperature is heightened, the setting preferably prevents heat from being released from the emission filter to the exhaust conduit due to fluidization of the exhaust gas existing inside the space.

In still another preferable embodiment of the emission control device, the emission filter is attached to the exhaust conduit via a heat insulating member. The cooperation of the heat insulating section formed between the emission filter and the exhaust conduit with the attachment of the filter via the heat insulating member more effectively prevents heat from being released from the joint of the filter to the exhaust conduit. This arrangement more effectively insulates the emission filter from the exhaust conduit and desirably keeps the filter temperature at the high level.

In another preferable application of the emission control device, the emission filter has the heat-resistant filter medium for collecting the particulates in the exhaust gas and a container to receive the heat-resistant filter medium therein. The container is provided with a guide element that leads the exhaust gas discharged from the combustion chamber to the heat-resistant filter medium. The guide element works to lead the flow of the exhaust gas to the heat-resistant filter medium and causes a large dynamic pressure to be produced in the filter medium, thus effectively raising the filter temperature. The guide element is formed in the container of the filter medium. Even when the flow of the exhaust gas hits against the guide element and releases part of the heat, the structure causes the released heat to be eventually used for heating the emission filter. This arrangement thus ensures an efficient rise of the filter temperature.

In still another preferable application of the emission control device, the emission filter has the heat-resistant filter medium and a container to receive the heat-resistant filter medium therein. The heat-resistant filter medium is received in the container such that an end of the filter medium is projected toward the combustion chamber. This arrangement causes the heat produced by the dynamic pressure of the exhaust gas not to be transmitted to the container but to immediately raise the temperature at the end of the heat-resistant filter medium. This arrangement thus desirably ensures a quick increase in temperature of the filter medium.

In the case where the emission control device is applied to an internal combustion engine provided with a supercharger that utilizes fluidization energy of the exhaust gas to actuate a turbine and thereby supercharge the induction air, one preferable embodiment sets the flow resistance of the emission filter to ½ to ⅔ of the flow resistance of the supercharger on a side of the turbine. The flow resistance in the course of discharging the exhaust gas mainly depends upon the flow resistance of the supercharger on the side of the turbine. Setting the flow resistance of the emission filter in the range of ½ to ⅔ of the flow resistance of the supercharger on the side of the turbine effectively prevents a total increase in flow resistance, even when the carbon-containing particulates are accumulated on the filter to slightly increase the flow resistance of the filter.

In the structure where the internal combustion engine is provided with a plurality of combustion chambers and the flows of the exhaust gas from the plurality of combustion chambers are united to at least one joint prior to emission, the emission filter may be disposed at the joint where the exhaust conduits from the respective combustion chambers are gathered. The arrangement of disposing the emission control device at the joint where the exhaust conduits from the plurality of combustion chambers are gathered does not require attachment of the emission filters to the individual combustion chambers and thus desirably reduces the total number of the emission filters. There is generally a sufficient space for installation of the emission filter at the joint of the exhaust conduits. Compared with the structure where the emission filters are disposed in the individual combustion chambers, this arrangement enhances the degree of freedom in shape of the filter and desirably designs the filter to an optimum shape.

The emission filter may be disposed at a joint where exhaust conduits from all the combustion chambers are united. In one preferable application, however, exhaust conduits from every two or three combustion chambers are gathered to one exhaust port, and the emission filter is disposed in each exhaust port. In the structure where all the exhaust conduits are gathered to one joint and the emission filter is disposed at the joint, there is a relatively large distance between the combustion chamber and the emission filter. This tends to undesirably lower the inflow temperature of the exhaust gas. In the structure of this preferable application where the exhaust conduits from every two or three combustion chambers are united to one exhaust port, on the other hand, there is a relatively small distance between the combustion chamber and each exhaust port. Attachment of the emission filter to each exhaust port effectively prevents a significant decrease in filter inflow temperature of the exhaust gas. This arrangement desirably enhances the effect of heating the emission filter by means of the dynamic pressure of the exhaust gas.

BRIEF DESCRIPTION OF THE DRAWINGS

FIG. 20 shows the durability of particulate filters having different man pore diameters;

BEST MODES OF CARRYING OUT THE INVENTION

With a view to further clarifying the functions and the effects of the present invention, some modes of carrying out the present invention are discussed below in the following sequence:

A. System Construction
A-1. General System Outline
A-2. Structure of Particulate Filter
A-3. Attachment Structure of Particulate Filter
B. Test Results
B-1. Results of Engine Bench Test
B-2. Results of Vehicle Test
B-3. Estimated Mechanism of Spontaneous Regenerating Function
B-4. Collection Model
B-5. Desired Dimension Ranges of Non-Woven Fabric
C. Modifications A. System Construction The following describes an embodiment in which an emission filter of the present invention (hereinafter referred to as a particulate filter) is applied to a Diesel engine. Application is naturally not restricted to the Diesel engines, but the emission filter of the present invention is applicable to gasoline engines where a fuel is directly injected into a cylinder for combustion and other internal combustion engines. The technique of the present invention is also applicable to any internal combustion engines for vehicles and ships as well as stationary internal combustion engines.

A-1. General System Outline

Figure 1:
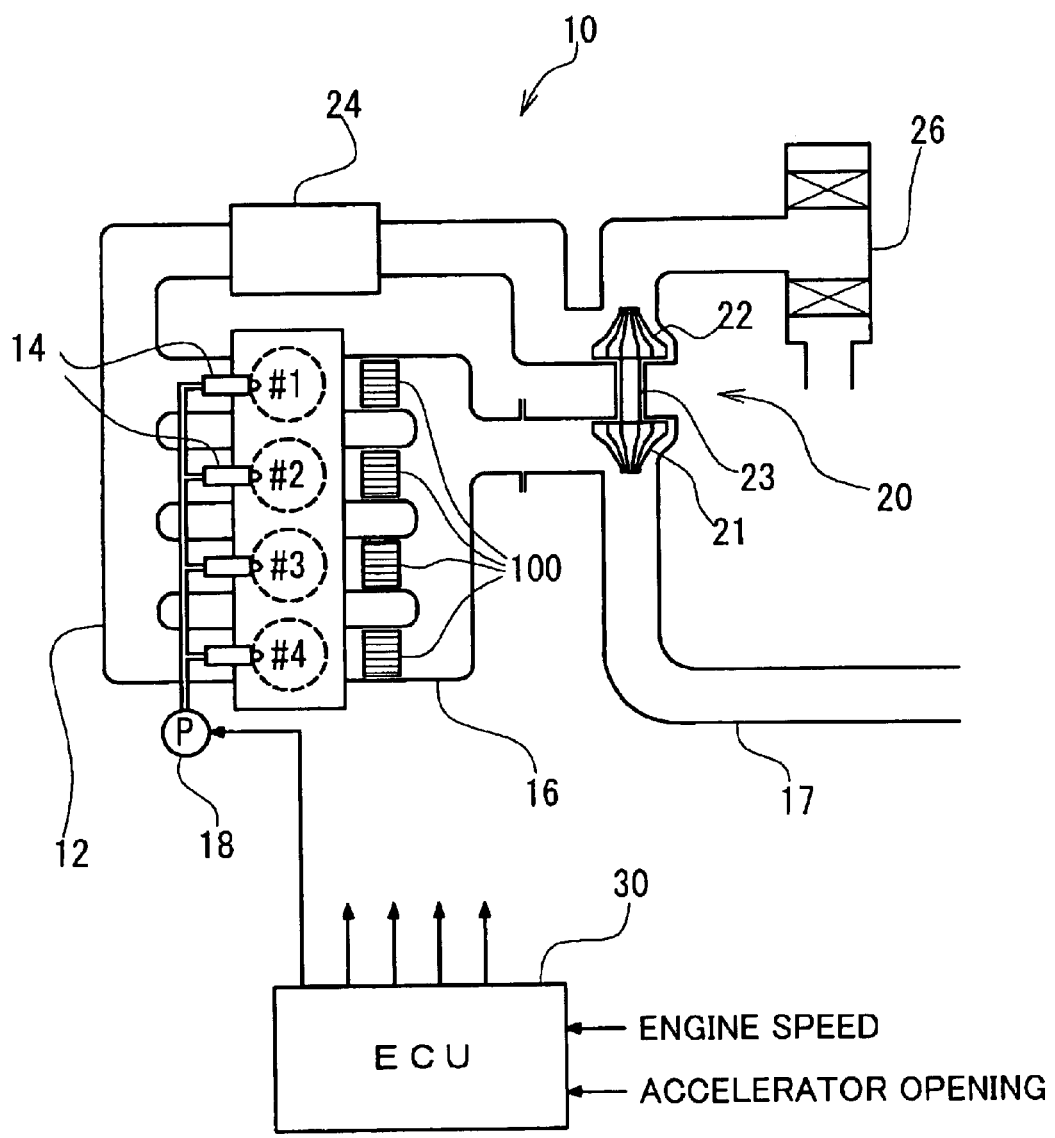
FIG. 1 illustrates the construction of an emission control system, where a particulate filter of an embodiment is applied to a Diesel engine.

FIG. 1 schematically illustrates the structure of a Diesel engine 10 with a particulate filter of the embodiment mounted thereon. The Diesel engine 10 is a 4-cylinder engine and has four combustion chambers #1 through #4. The air is supplied to each of the combustion chambers via an intake pipe 12, while a fuel is injected from a fuel injector 14 set in each combustion chamber. This leads to combustion of the air and the fuel in the combustion chamber, and exhaust gas is discharged through an exhaust manifold 16 to an exhaust pipe 17.

A supercharger 20 is provided in the middle of the exhaust pipe 17. The supercharger 20 has a turbine 21 located in the exhaust pipe 17, a compressor 22 set in the intake pipe 12, and a shaft 23 connecting the turbine 21 with the compressor 22. The flow of exhaust gas discharged from the combustion chamber rotates the turbine 21 of the supercharger 20 to drive the compressor 22 via the shaft 23. The air is then compressed and fed into each combustion chamber. An air cleaner 26 is provided in the upstream of the compressor 22. The compressor 22 compresses the intake air through the air cleaner 26 and supplies the compressed air to the combustion chamber. An inter cooler 24 for cooling down the air is disposed in the downstream of the compressor 22. Compression of the air by the compressor 22 raises the temperature of the air. The compressed air may thus be cooled down by the inter cooler 24 and subsequently fed into the combustion chamber. A particulate filter 100 is provided in each of the combustion chambers #1 through #4 in the upstream of the turbine 21. A control unit (hereinafter referred to as control ECU 30) for controlling the engine receives information relating to a required output torque, for example, the engine speed and the accelerator opening, and controls the fuel injector 14, a fuel supply pump 18, and other diverse actuators (not shown) based on the input information, thus adequately regulating the driving conditions of the Diesel engine.

A-2. Structure of Particulate Filter

Figure 2:
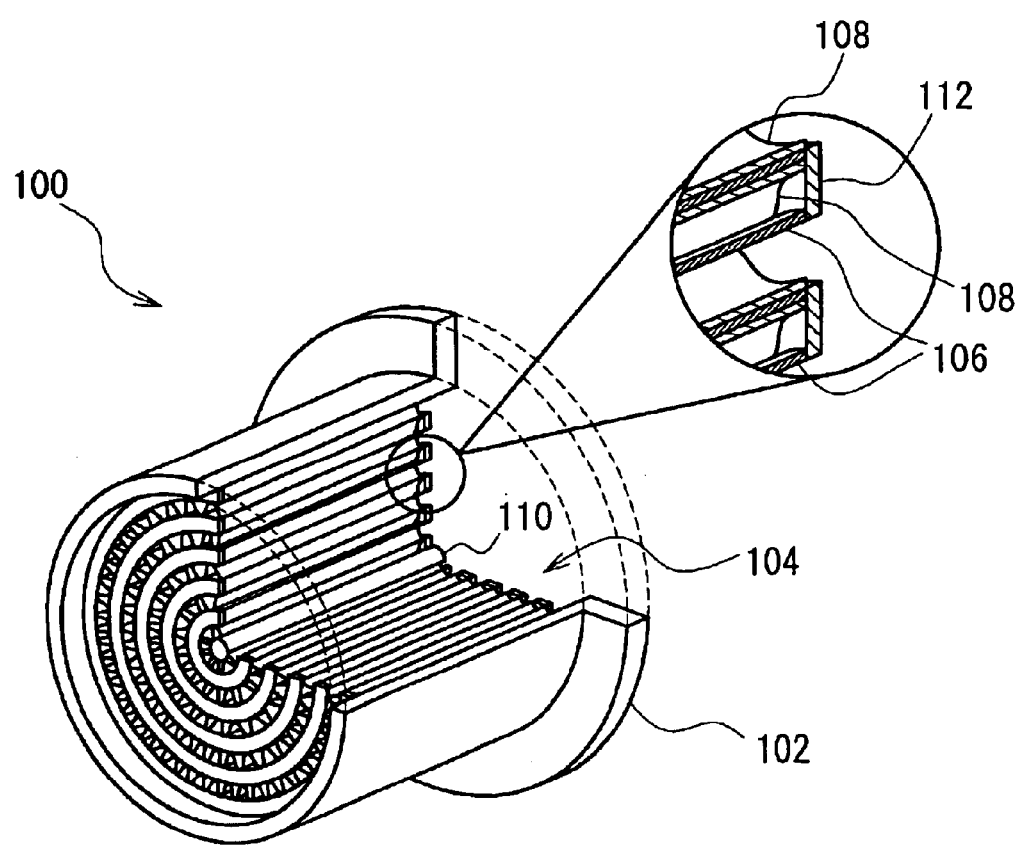
FIG. 2 shows the appearance and the structure of the particulate filter in the embodiment.

FIG. 2 is a perspective view illustrating the appearance of the particulate filter 100 of the embodiment. With a view to better understanding, part of the cross section is enlarged to show the internal structure. The particulate filter 100 includes a cylindrical case 102 with a flange and an element 104 that is inserted in the case 102 and has the outer circumference welded to the case 102. The element 104 has a rolled cylindrical structure, in which a non-woven fabric 106 of a heat-resistant metal and a corrugated sheet 108 of a heat-resistant metal in piles are rolled up on a core 110. The element 104 used in the particulate filter 100 of the embodiment has the outer diameter of approximately 55 mm and the length of approximately 40 mm. These dimensions can appropriately be varied according to the displacement of the Diesel engine and the inner diameter of the exhaust conduit.

Figure 3:
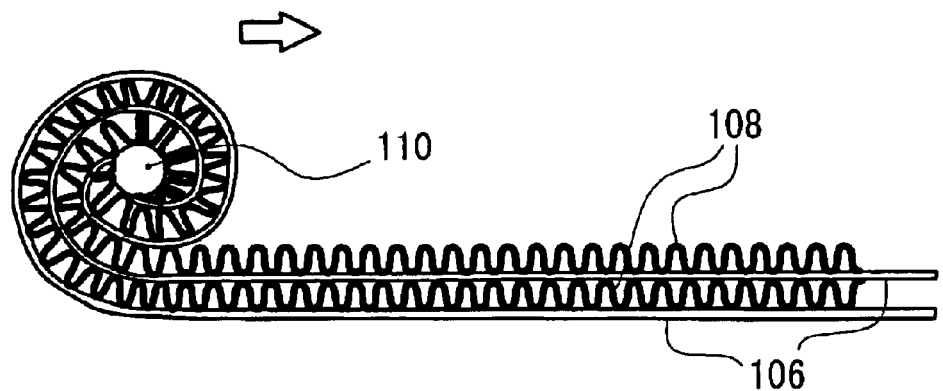
FIG. 3 shows a method of manufacturing an element used for the particulate filter of the embodiment.

FIG. 3 conceptually illustrates the process of rolling up the non-woven fabric 106 and the corrugated sheet 108 in piles on the core 110. The corrugated sheet 108 functions to keep the adjoining fragments of the rolled-up non-woven fabric 106 at fixed intervals. A large number of pathways along the axis of the core 110 are accordingly formed between the non-woven fabric 106 and the corrugated sheet 108. Sealing plates 112 are welded to both sides of the element 104. The sealing plates 112 alternately close the pathways formed between the non-woven fabric 106 and the corrugated sheet 108 to define the construction that allows the flow of the exhaust gas to pass through the non-woven fabric 106. The function of the sealing plates 112 to define the construction that allows passage of the exhaust gas through the non-woven fabric 106 is discussed below with reference to FIG. 4.

Figure 4:
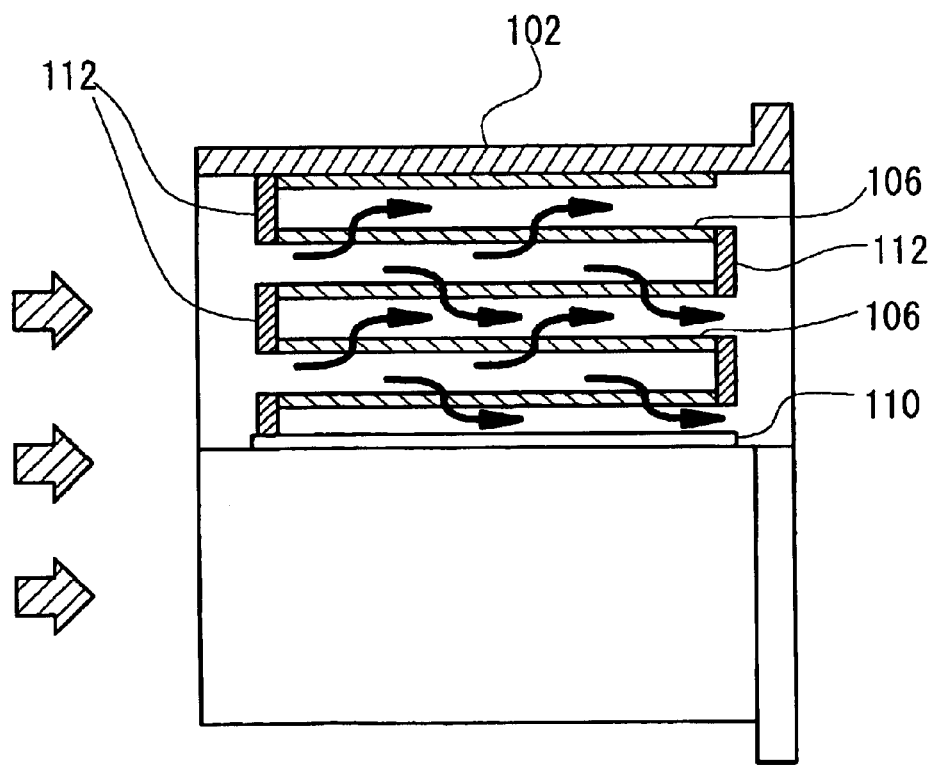
FIG. 4 conceptually shows a process of collecting particulates included in an exhaust gas by means of the particulate filter.

FIG. 4 conceptually illustrates the sectional structure of the particulate filter 100. The corrugated sheet 108 is omitted from the illustration of FIG. 4. As clearly shown, the sealing plates 112 alternatively close the pathways formed between the adjoining fragments of the non-woven fabric 106 kept at fixed intervals. The flow of the exhaust gas from the left side of the drawing as shown by the hatched arrows in FIG. 4 flows into the pathways that are not closed by the sealing plates 112. The outlets of these pathways are, however, closed by the sealing plates 112. The flow of the exhaust gas accordingly passes through the non-woven fabric 106 defining the side faces of the pathways and goes to the pathways having the non-closed outlets as shown by the thick arrows. As the flow of the exhaust gas passes through the non-woven fabric 106, carbon-containing particulates like soot and hydrocarbon compounds included in the exhaust gas are collected by the non-woven fabric 106.

Figures 5, 6:
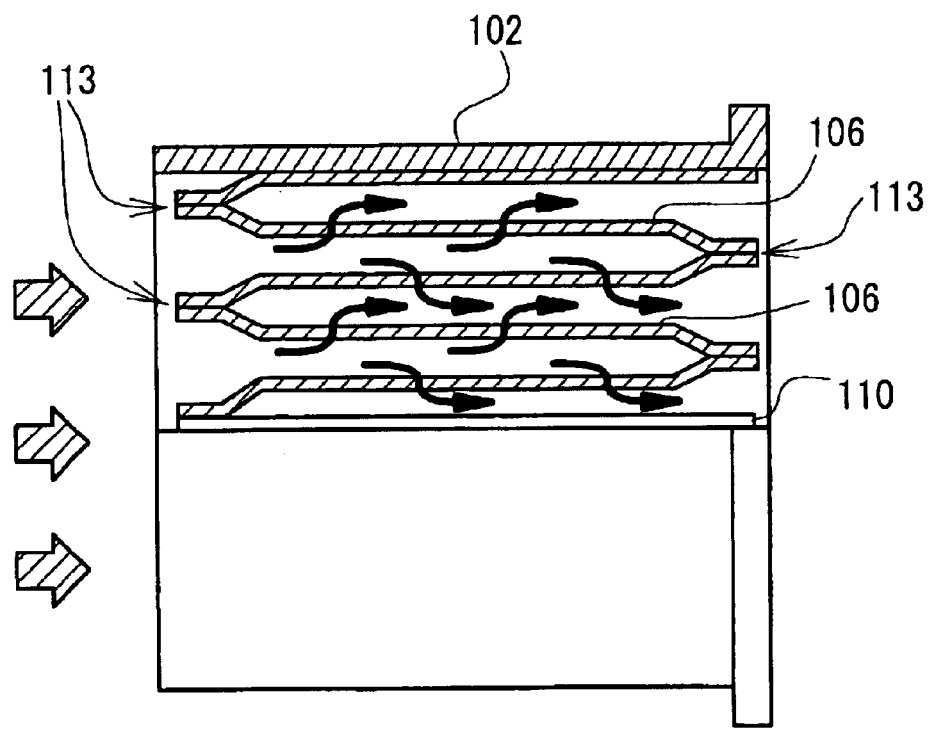
FIG. 5 shows dimensions of non-woven fabrics applicable for the particulate filter of the embodiment.
FIG. 6 conceptually shows another process of collecting particulates included in the exhaust gas by means of a particulate filter of a modified example.

The non-woven fabric 106 is made of a heat-resistant iron alloy. In the particulate filter 100 of the embodiment, a metal non-woven fabric having dimensions in a predetermined range is applied for the non-woven fabric 106. This arrangement enables the carbon-containing particulates and the hydrocarbon compounds to be dispersedly collected in such a manner that brings the respective particulates and hydrocarbon compounds in contact with oxygen in the exhaust gas. The effects of the dimensions of the non-woven fabric will be discussed later in detail. Here exemplified dimensions of the non-woven fabric 106 are shown in FIG. 5. The dimensions of the non-woven fabric shown in FIG. 5 are only illustrative and are not restrictive in any sense. A metal non-woven fabric made of a Fe—Cr—Al alloy is used in this embodiment. The non-woven fabric may otherwise be composed of any other known heat-resistant metals like Ni alloy or ceramic fibers like silicon carbide fibers.

The reason why the non-woven fabric having the predetermined dimensions as illustrated in FIG. 5 can dispersedly collect the carbon-containing particulates and the hydrocarbon compounds in the exhaust gas has not yet been fully elucidated. According to the estimated mechanism discussed later, it is expected that not only the metal non-woven fabric but a ceramic filter having similar dimensions, such as a cordierite ceramic honeycomb filter, gives equivalent results to those of this embodiment.

In the structure of this embodiment, the sealing plates 112 are welded to both the sides of the element 104. One possible modification is a structure without the sealing plates 112.

FIG. 6 is a sectional view illustrating the modified structure of the particulate filter 100 in which the element does not have the sealing plates. For clarity of illustration, the corrugated sheet 108 is omitted from the illustration of FIG. 6. In the structure of the embodiment shown in FIG. 4, the sealing plates 112 are alternately welded to both the sides of the non-woven fabric 106. Instead of welding the sealing plates, the adjoining fragments of the non-woven fabric are welded to each other at ends 113 in the modified structure shown in FIG. 6. Such modified arrangement does not require the sealing plates 112 and thus simplifies the structure of the particulate filter 100.

A-3. Attachment Structure of Particulate Filter

Figure 7:
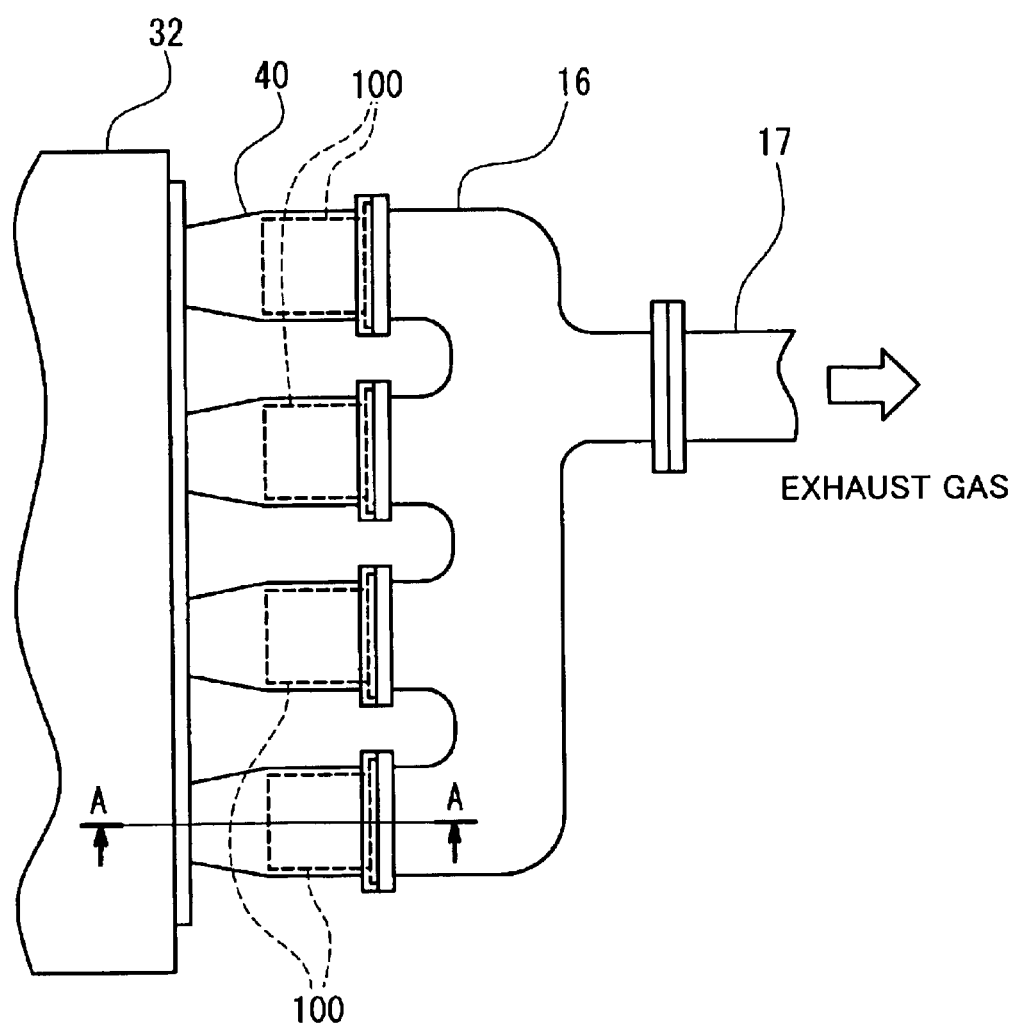
FIG. 7 shows an attachment structure for fixing the particulate filter to the Diesel engine.

FIG. 7 illustrates an attachment structure for fixing the particulate filter 100 to the Diesel engine 10. As illustrated, a filter holder 40 is provided between a cylinder head 32 defining the upper portion of the combustion chambers and the exhaust manifold 16. The particulate filters 100 are set in the respective combustion chambers in the filter holder 40. The filter holder 40 is clamped to the cylinder head 32 with bolts. When the exhaust manifold 16 is clamped with bolts after insertion of the particulate filters 100 in the filter holder 40, the flanges are interposed between the filter holder 40 and the exhaust manifold 16 to fix the particulate filters 100.

Figure 8:
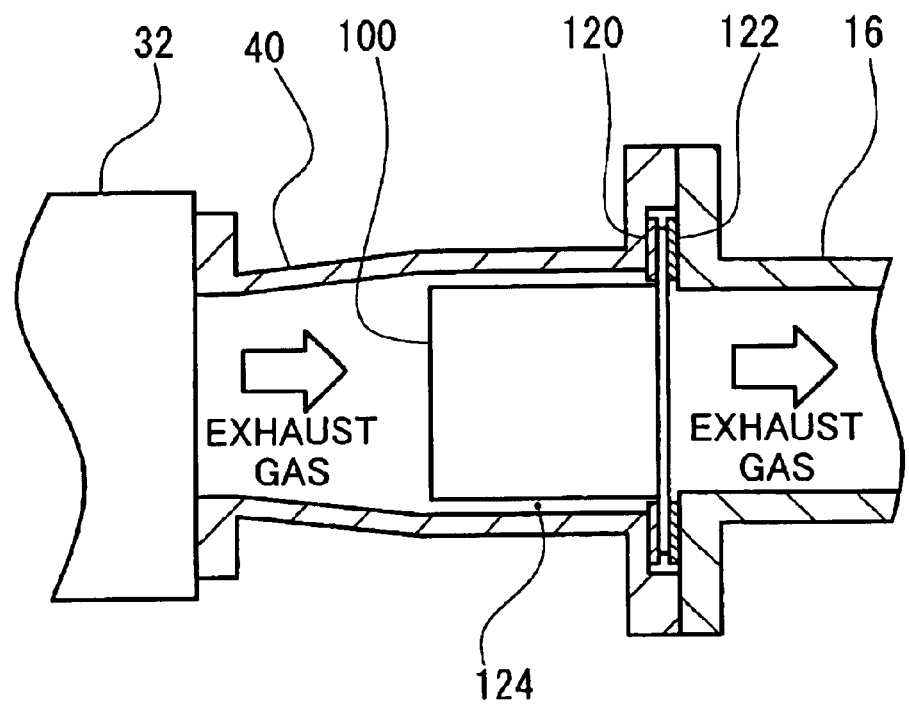
FIG. 8 shows the particulate filter attached to the Diesel engine via a filter holder.

FIG. 8 illustrates the particulate filter 100 attached to the Diesel engine 10 via the filter holder 40. As illustrated, the inner diameter of the filter holder 40 is a little greater than the dimensions of the particulate filter 100. There is accordingly a gap 124 between the outer circumference of the particulate filter 100 and the inner circumference of the filter holder 40. The two faces of the flange of the particulate filter 100 are held between the filter holder 40 and the exhaust manifold 16 via heat-insulating members 120 and 122 composed of, for example, glass fibers.

Figure 28A:
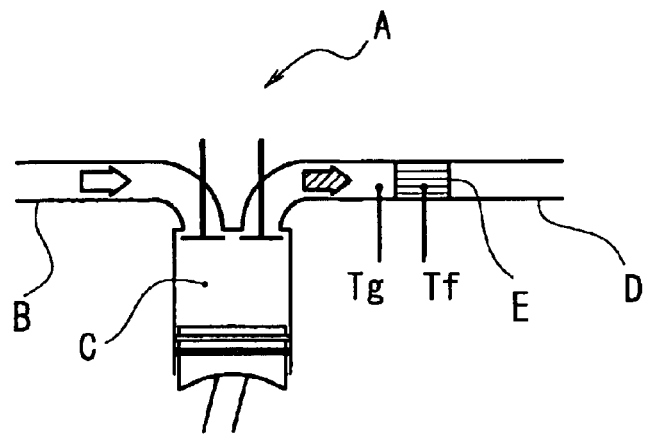
FIG. 28 shows an estimated principle of converting fluidization energy of the exhaust gas into temperature on the filter.
Figure 28B:
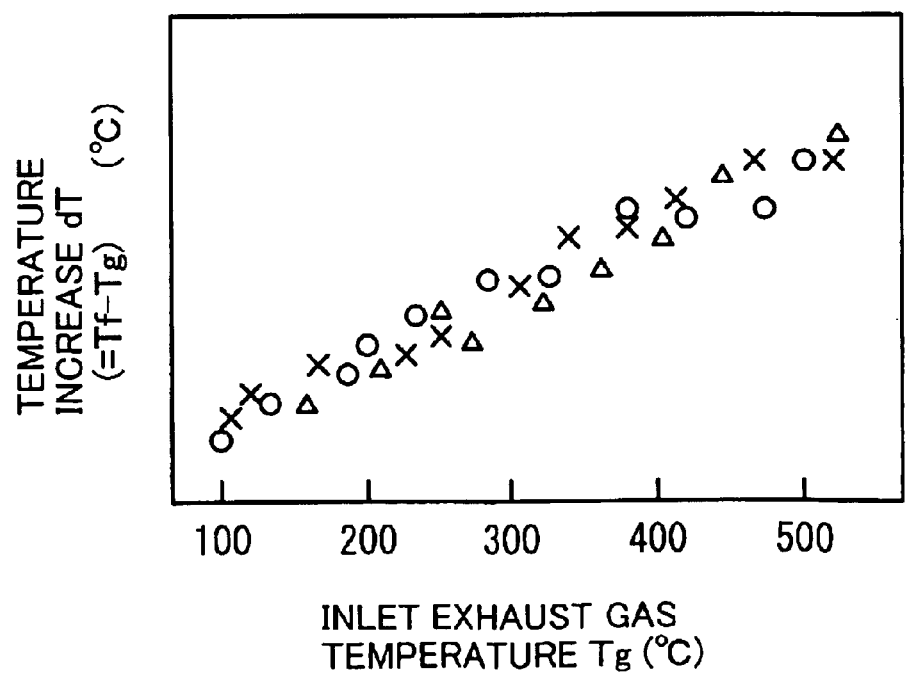

Attachment of the particulate filter 100 to the Diesel engine 10 in this manner efficiently converts the fluidization energy of the exhaust gas into heat and raises the filter temperature. In this structure, the particulate filter 100 is located close to the combustion chamber. The exhaust gas vigorously ejected from the combustion chamber simultaneously with opening of a exhaust valve of the Diesel engine 10 is accordingly flown into the particulate filter 100 without attenuating the flow rate and being cooled down. As discussed previously with reference to FIG. 28, the increase of the filter temperature relative to the temperature of the exhaust gas is enhanced with an increase in temperature of the inflow exhaust gas. The large flow rate enhances the pressure increase of the filter and thereby the increase of the filter temperature (see Equation (4) given above).

As shown in FIG. 8, there is a gap 124 between the outer circumferential face of the particulate filter 100 and the inner circumferential face of the filter holder 40. The flange of the particulate filter 100 is disposed via the heat insulating members 120 and 122. This structure effectively prevents the heat produced in the particulate filter 100 from being transmitted to the filter holder 40 and the exhaust manifold 16. The arrangement thus enables the heat produced in the particulate filter 100 to be kept in the filter 100 without being transmitted to the filter holder 40 and the exhaust manifold 16, thus efficiently converting the dynamic pressure of the exhaust gas into the filter temperature.

It is preferable that the gap 124 defined between the outer circumferential face of the particulate filter 100 and the inner circumferential face of the filter holder 40 is set to be not greater than 1 mm. Setting a sufficiently small value, that is, a value of not greater than 1 mm, to the gap restricts the flow of the exhaust gas inside the gap. As the exhaust gas is fluidized inside the gap 124, the exhaust gas takes heat from the side face of the particulate filter 100 and transfers the heat to the filter holder 40. Namely heat, though only a little quantity, is transmitted from the filter to the filter holder. The gap 124 of not greater than 1 mm effectively prevents transmission of such a little quantity of heat.

B. Test Results

The following describes the results of various tests where the particulate filter 100 discussed above is applied to the Diesel engine.

B-1. Results of Engine Bench Test

Figure 9:
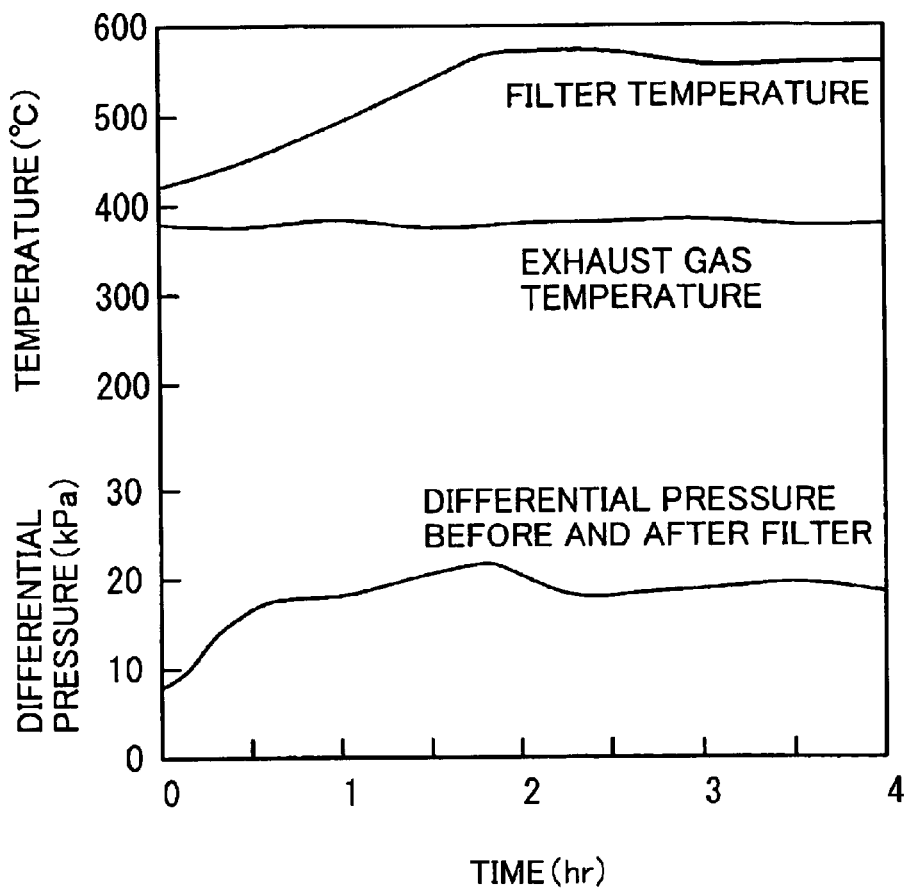
FIG. 9 is a graph showing variations in filter temperature and differential pressure before and after the filter when the particulate filter of the embodiment was applied to the Diesel engine.

FIG. 9 is a graph showing variations of the observed differential pressure before and after the filter, the observed temperature of the exhaust gas flown into the filter, and the observed filter temperature at the filter outlet, when the particulate filter 100 of the embodiment was applied to a 4-cylinder Diesel engine and an engine bench test was performed under the conditions of steady drive. The abscissa of FIG. 9 shows the driving time of the engine. The 4-cylinder Diesel engine of 4.3 L displacement was steadily driven under the conditions of the engine speed of 1630 rotations per minute and the torque of 95 Nm. The temperature of the exhaust gas was measured at an upstream position of about 50 mm apart from the filter with avoiding the effects of radiation from the filter.

As shown in the graph of FIG. 9, the temperature of the exhaust gas flown into the particulate filter 100 was substantially fixed at about 380° C. The filter temperature, on the other hand, gradually rose and reached 550° C. at approximately 1.5 hours after the start of the measurement. The filter temperature continued rising and eventually reached 575° C. The filter temperature was higher than the temperature of the exhaust gas flown into the filter by approximately 40° C. to 50° C. immediately after the start of the measurement. This is ascribed to the conversion of the fluidization energy of the exhaust gas into heat in the particulate filter 100 as described previously.

As mentioned previously, it is thought that the carbon-containing particulates like soot included in the exhaust gas are subjected to combustion only at high temperatures of not lower than 550° C. The gradual increase in filter temperature at the substantially fixed temperature 380° C. of the exhaust gas flown into the filter may be ascribed to the phenomenon that the hydrocarbon compounds other than soot included in the exhaust gas are collected by the particulate filter and are subjected to an exothermic reaction with oxygen in the exhaust gas. When the filter temperature reaches 550° C., the carbon-containing particulates like soot collected on the filter start combustion.

The graph of FIG. 9 also shows a variation of the observed differential pressure before and after the filter. The differential pressure before and after the filter increased immediately after the start of the measurement and was then practically kept unchanged as a whole. More specifically, the differential pressure gradually increased immediately after the start of the measurement and tended to decrease when the filter temperature reached its maximum.

Figure 10:
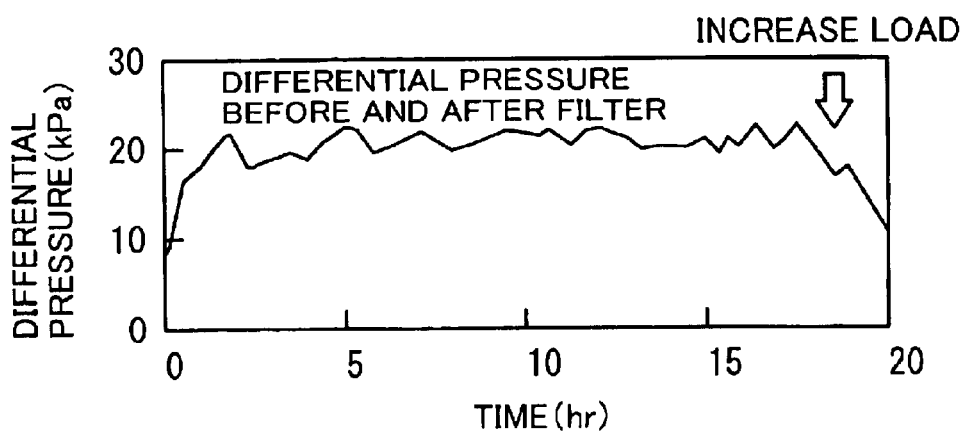
FIG. 10 is a graph showing a variation in differential pressure before and after the filter when the Diesel engine with the particulate filter of the embodiment attached thereto was driven for a long time period.

FIG. 10 is a graph showing a variation in differential pressure before and after the filter when the operation of the Diesel engine continued under the same driving conditions as those of FIG. 9. The differential pressure before and after the filter was slightly varied but did not tend to increase in the course of the continuous operation of the engine. In general, it is expected that the continuous operation of the Diesel engine with the filter collecting the carbon-containing particulates in the emission causes the filter to be clogged and increases the differential pressure unless the collected particulates are treated by any method. As described above, however, the differential pressure before and after does not tend to increase in the case of the particulate filter of the embodiment. It is accordingly thought that the collected carbon-containing particulates are subjected to combustion on the filter, irrespective of the low temperature 380° C. of the exhaust gas flown into the filter. When the load of the engine was enhanced at 18 hours after the start of the measurement, the differential pressure before and after the filter decreased as shown by the arrow in the graph. The enhanced load raises the temperature of the exhaust gas flown into the filter and accelerates combustion of the carbon-containing particulates collected on the filter.

Figure 11:
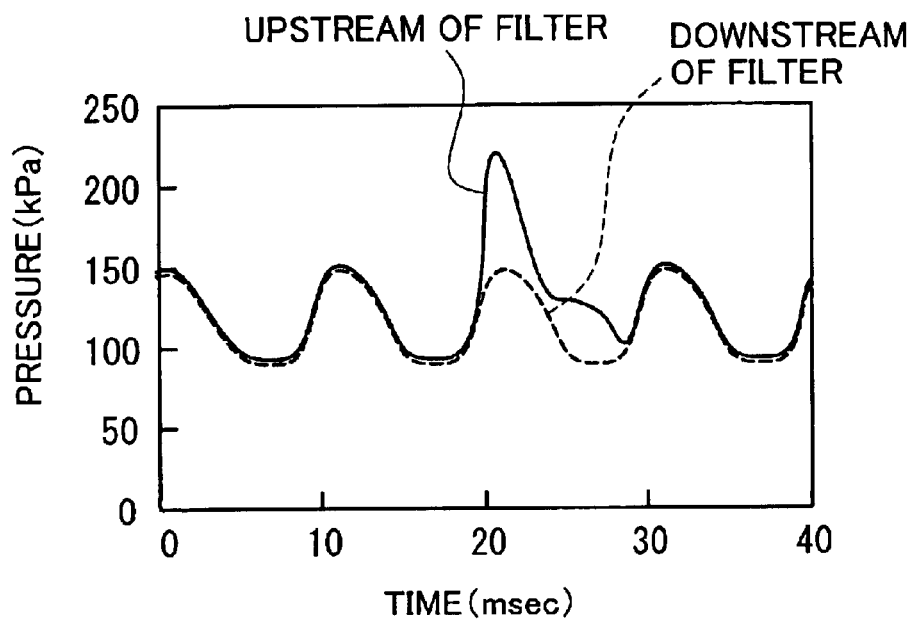
FIG. 11 is a graph showing a difference between the pressure variations in an exhaust conduit before and after the particulate filter.

FIG. 11 is a graph showing the observed pressure variations in an exhaust conduit during operations of the Diesel engine. In the Diesel engine, at the moment of opening an exhaust valve, the high-pressure exhaust gas in the combustion chamber is ejected via the exhaust valve and flows in the exhaust conduit as a pressure wave. As shown in FIG. 11, there was a significant variation in the upstream of the particulate filter 100 at the moment of opening the exhaust valve. The pressure wave was abruptly attenuated, on the other hand, in the downstream of the particulate filter 100. This shows that the flow of the exhaust gas ejected into the exhaust conduit simultaneously with the opening of the exhaust valve is attenuated and converted into heat, while passing through the particulate filter 100 of the embodiment.

As described above with reference to FIGS. 9 through 11, the particulate filter 100 of the embodiment effectively collects the carbon-containing particulates included in the exhaust gas from the Diesel engine and makes the collected particulates subjected to combustion without any special control. The estimated mechanism to attain such combustion will be discussed later.

B-2. Results of Vehicle Test

Figure 12:
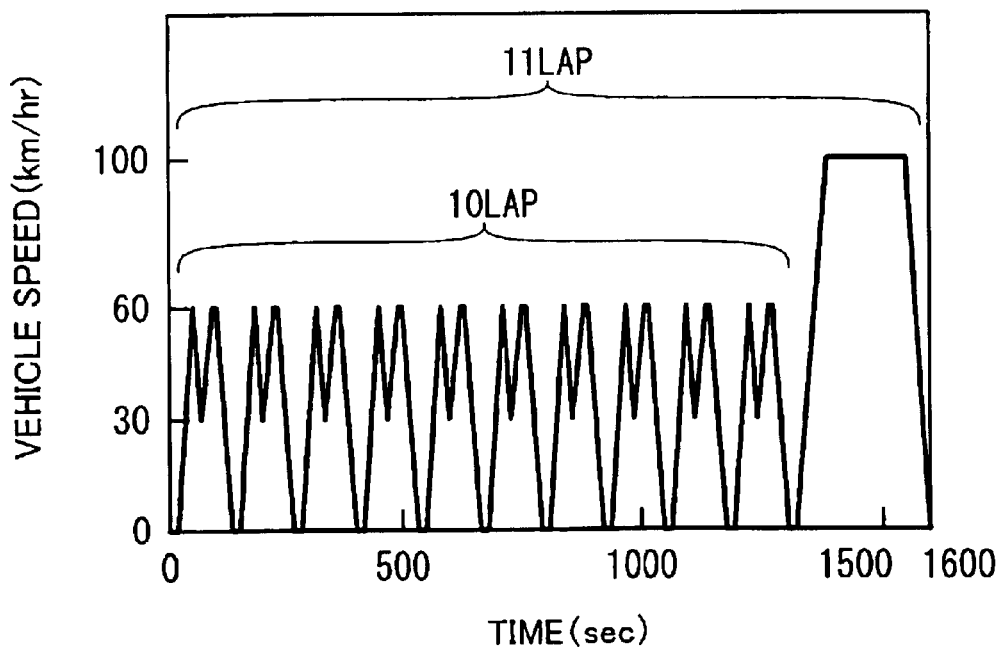
FIG. 12 is a graph showing a drive pattern of a vehicle in a test.

The following describes the results of tests with the particulate filter 100 of the embodiment applied to the Diesel engine mounted on the vehicle. Each of the tests measured the temperature of the exhaust gas flown into the particulate filter 100, the filter temperature, and the differential pressure before and after the filter, while driving the vehicle according to a predetermined drive pattern, which repeated acceleration and deceleration. Two drive patterns, '10 lap pattern' and '11 lap pattern' shown in FIG. 12, were mainly used for the tests.

The 10 lap pattern repeats a series of driving pattern, where the vehicle is accelerated from the halt condition to the speed of 60 km per hour and is then decelerated from the speed of 60 km per hour to the halt condition, 10 times. The 11 lap pattern adds another series of driving pattern, where the vehicle is accelerated from the halt condition to the speed of 100 km per hour and is then decelerated from the speed of 100 km per hour to the halt condition, as an 11$^{th}$ lap after the 10 lap pattern.

(1) Test Results in 10 Lap Run

Figure 13:
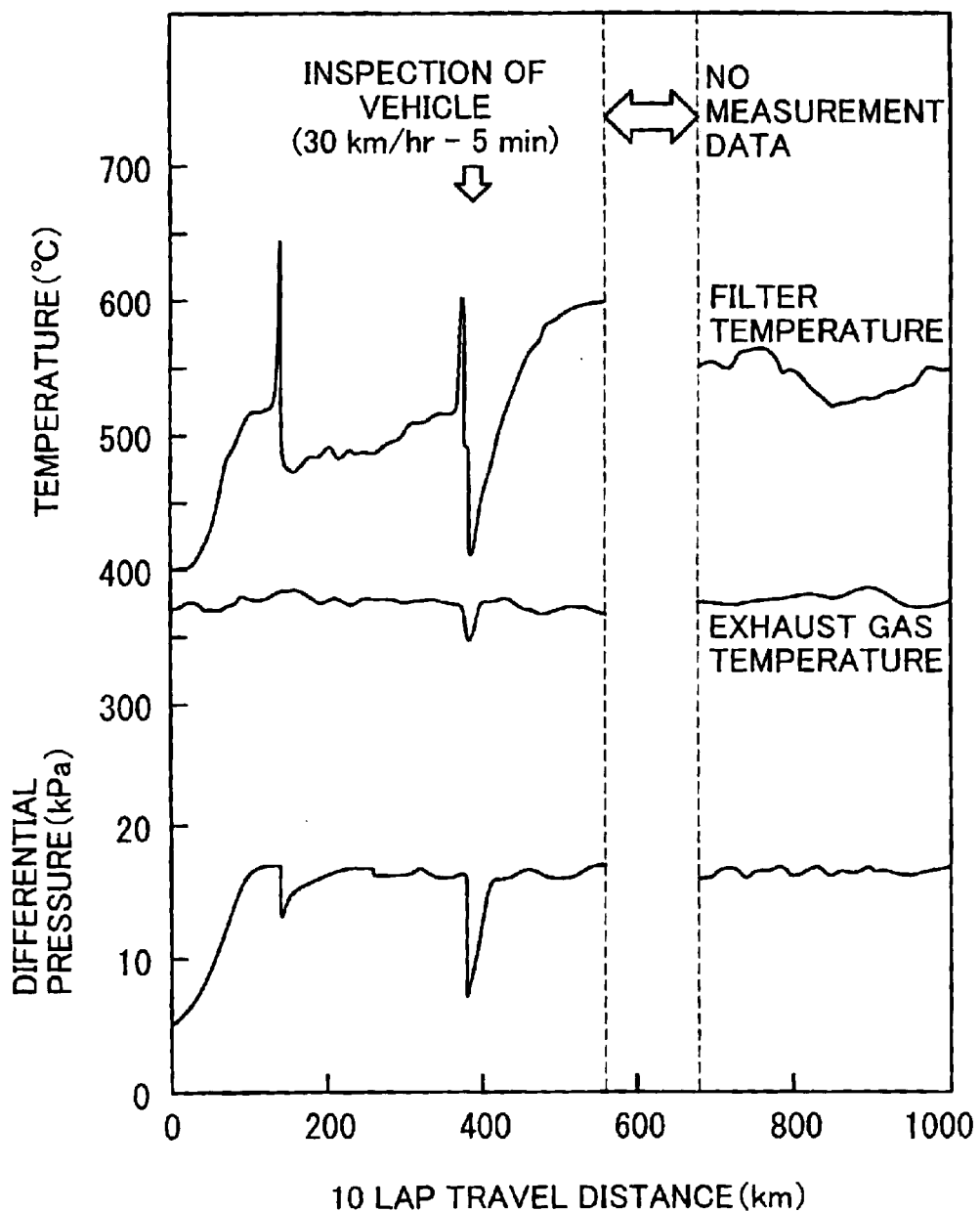
FIG. 13 is a graph showing measurement results of the filter temperature and the differential pressure before and after the filter during a run of the 10 lap pattern with the particulate filter of the embodiment applied to the Diesel engine.

FIG. 13 is a graph showing measurement results of the temperature of the exhaust gas flown into the particulate filter 100, the filter temperature, and the differential pressure before and after the filter in the course of a run repeating the 10 lap pattern.

As illustrated, the temperature of the exhaust gas flown into the filter varied in the range of 370° C. to 400° C. during a run. The filter temperature was 400° C. immediately after the start of the measurement and gradually increased to about 520° C. The higher filter temperature than the temperature of the exhaust gas flown into the filter by approximately 30° C. immediately after the start of the measurement is ascribed to conversion of the fluidization energy of the exhaust gas into heat in the filter as described previously. The particulate filter 100 has the adiabatic structure, so that the filter temperature quickly rises.

The filter temperature abruptly increased to instantaneously reach 650° C. at the driving distance of approximately 140 km and was quickly lowered to about 470° C. The abrupt increase in filter temperature is ascribed to vigorous combustion of the carbon-containing particulates and the hydrocarbon compounds in the exhaust gas collected on the particulate filter. The subsequent quick decrease in filter temperature is attributable to a decrease in quantity of particulates subjected to combustion. The differential pressure before and after the filter was abruptly lowered, due to combustion of the collected particulates.

The filter temperature, which was once lowered to 470° C. due to completion of the combustion of the carbon-containing particulates collected on the filter, gradually rose with a further progress of the drive. The filter temperature reached about 520° C., again abruptly rose to instantaneously reach 600° C. at the driving distance of approximately 390 km, and was quickly lowered to about 490° C. Like the moment of the 140 km driving distance, it is expected that the carbon-containing particulates collected on the particulate filter are subjected to vigorous combustion at this moment.

The differential pressure before and after the filter, the temperature of the exhaust gas flown into the filter, and the filter temperature varied, immediately after the filter temperature abruptly increased at the 390 km driving distance and was again lowered to about 490° C. This is because the vehicle was driven at the speed of 30 km per hour for 5 minutes for the purpose of inspection. Reduction of the vehicle speed to the level of 30 km per hour decreased the filter temperature to about 420° C. As described later, the reactions of the carbon-containing particulates and the hydrocarbon compounds are kept even under the condition of the vehicle speed of 30 km per hour.

As shown in FIG. 13, during the run of the 10 lap pattern, collection and combustion of the carbon-containing particulates and the hydrocarbon compounds in the exhaust gas are repeated on the filter. The differential pressure before and after the filter is slightly varied with the progress of the repeated collection and combustion, but is practically stabilized. There is no sign of clogging the filter with the progress of the run.

(2) Test Results in 11 Lap Run

Figure 14:
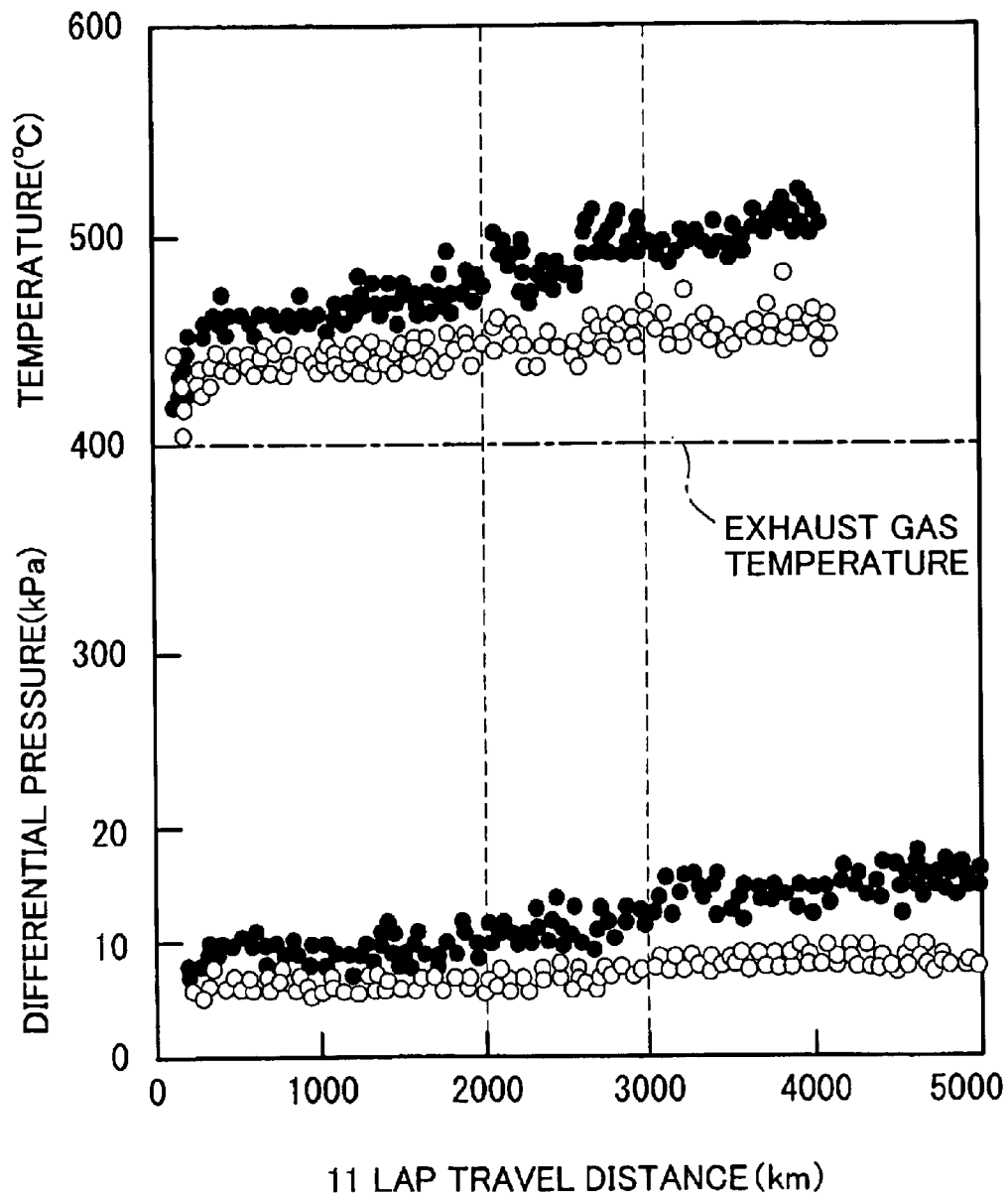
FIG. 14 is a graph showing measurement results of the filter temperature and the differential pressure before and after the filter during a run of the 11 lap pattern with the particulate filter of the embodiment applied to the Diesel engine.

FIG. 14 is a graph showing measurement results of the filter temperature of the particulate filter 100 and the differential pressure before and after the filter in the course of a run repeating the 11 lap pattern.

As mentioned above with reference to FIG. 12, the 11 lap drive pattern adds another series of driving pattern, where the vehicle is accelerated from the halt condition to the speed of 100 km per hour and is then decelerated from the speed of 100 km per hour to the halt condition, as the 11th lap after the 10 lap pattern. The filter temperature temporarily reaches 600° C. during acceleration of the 11$^{th}$ lap. It is expected that the carbon-containing particulates collected on the filter are subjected to combustion at this moment. Namely the vehicle runs according to the 11 lap pattern, while the collected particulates are regularly subjected to combustion during the acceleration of the 11$^{th}$ lap. The variations in filter temperature and differential pressure over the filter with the progress of the drive were measured before and after the acceleration of the 11$^{th}$ lap. The measurement values 'before the acceleration of the 11$^{th}$ lap' represent the observed values at the timing of acceleration of the 10$^{th}$ lap, and the measurement values 'after the acceleration of the 11$^{th}$ lap' represent the observed values at the timing of acceleration of the 1$^{st}$ lap.

The graph of FIG. 14 shows the variations of the filter temperature and the differential pressure over the filter before and after the acceleration of the 11$^{th}$ lap in the 11 lap run. The closed circles represent the measurement results before the acceleration of the 11$^{th}$ lap (that is, at the time of the acceleration of the 10$^{th}$ lap). The open circles represent the measurement results after the acceleration of the 11$^{th}$ lap (that is, at the time of the acceleration of the 1$^{st}$ lap). The temperature of the exhaust gas flown into the particulate filter was substantially fixed to 400° C. For simplicity of explanation, 'before the acceleration of the 11$^{th}$ lap' and 'after the acceleration of the 11$^{th}$ lap' are respectively expressed as 'before the acceleration to 100 km per hour' and 'after the acceleration up to 100 km per hour'.

As shown in FIG. 14, the filter temperature and the differential pressure before and after the filter roughly vary in the following manner during the run of the 11 lap pattern. While the differential pressure after the acceleration to 100 km per hour (expressed by the open circles) was kept low, the differential pressure after the low-speed drive of the 10 laps up to the vehicle speed of 60 km per hour and before the acceleration to 100 km per hour (expressed by the closed circles) gradually increased. The filter temperature reaches 600° C. during acceleration to 100 km per hour, and the collected soot starts combustion. This may be the reason why the filter temperature and the differential pressure over the filter decrease after the acceleration to 100 km per hour.

The filter temperature prior to acceleration to 100 km per hour (expressed by the closed circles) was approximately 460° C. in the range of the driving distance up to 2000 km after the start of the drive, gradually increased in the range of the driving distance from 2000 km to 3000 km, and was practically stabilized at temperature exceeding 500° C. in the range of the driving distance after 3000 km. The drive is accordingly divided into three periods according to the driving distance, the initial period up to 2000 km, the transient period between 2000 km and 3000 km, and the period after 3000 km. In the initial period from the start of the drive to the driving distance of 2000 km with the low filter temperature, the hydrocarbon compounds are subjected to the reaction during the low-speed drive of the 10 laps, while the carbon-containing particulates like soot are subjected to combustion during the high-speed drive of the 11$^{th}$ lap. In the period of the driving distance after 3000 km, on the other hand, the filter temperature intermittently reaches 550° C. even during the low-speed drive of the 10 laps to start combustion of the collected carbon-containing particulates.

The difference between the filter temperature before acceleration to 100 km per hour and the filter temperature after the acceleration was approximately 20° C. in the initial period from the start of the drive to the driving distance to 2000 km, and increased to about 50° C. in the period of the driving distance after 3000 km. This is ascribed to partial combustion of soot even during the low-speed drive of the 10 laps in the period of the driving distance after 3000 km.

(3) Test Results in Extremely Low-speed Run

Figure 15:
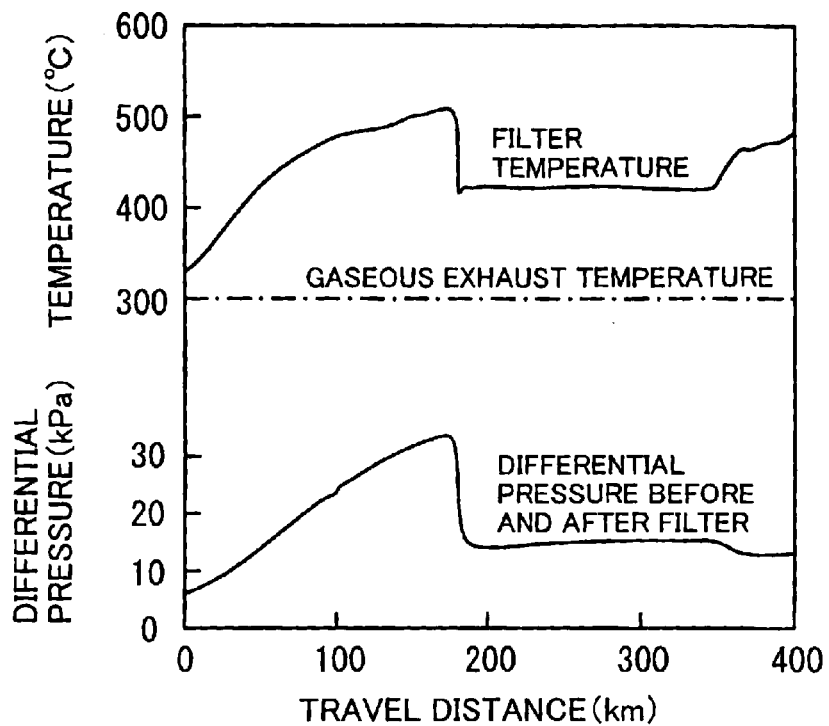
FIG. 15 is a graph showing measurement results of the filter temperature and the differential pressure before and after the filter during a run of an extremely low-speed drive pattern with the particulate filter of the embodiment applied to the Diesel engine.

As described previously with reference to FIG. 13, the filter temperature is abruptly lowered with a decrease in vehicle speed to 30 km per hour during the 10 lap run. This, however, does not mean no-combustion of the collected carbon-containing particulates during the low-speed drive. The collected carbon-containing particulates are subjected to combustion even during the low-speed drive of 30 km per hour. FIG. 15 is a graph showing measurement results of the filter temperature during a run of an extremely low-speed drive pattern repeating acceleration and deceleration between the halt condition and the vehicle speed of 30 km per hour. The temperature of the exhaust gas flown into the filter was approximately 300° C. As illustrated in the graph, during the extremely low-speed drive, the filter temperature gradually increased and reached 500° C. at the driving distance of 160 km. The filter temperature repeated such a variation, while the differential pressure over the filter was stabilized. Namely there is no sign of clogging the filter.

(4) Test Results in Comparative Example

Figure 16:
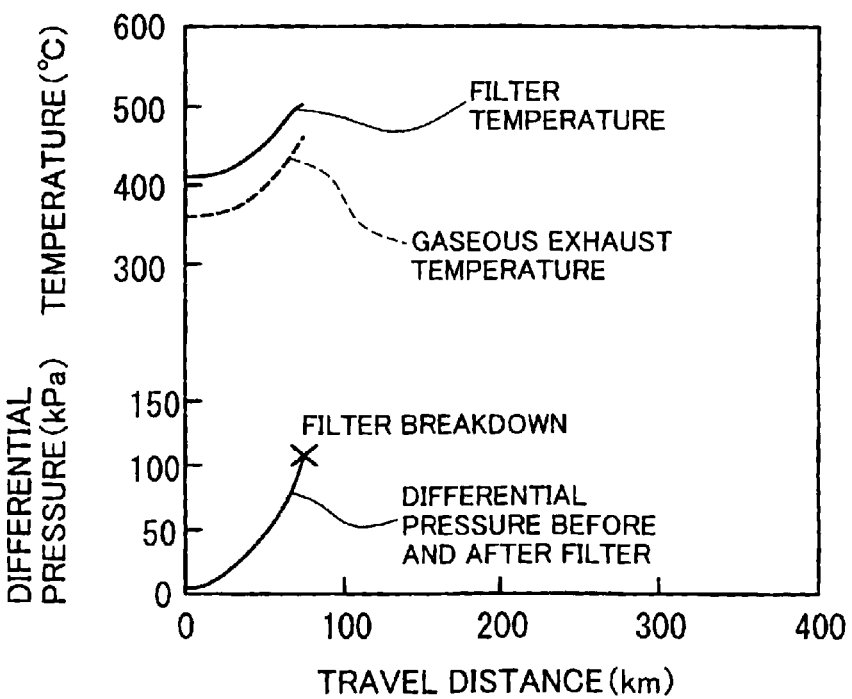
FIG. 16 is a graph showing measurement results of the filter temperature and the differential pressure before and after the filter during a run of the 10 lap pattern with a particulate filter made of a non-woven fabric having a pore diameter smaller than an appropriate value.

FIG. 16 is a graph showing measurement results of the filter temperature and the differential pressure before and after the filter during a run with a particulate filter made of a heat-resistant metal, non-woven fabric having a distribution of pore diameter smaller than a preset range, for the purpose of comparison. The run followed the 10 lap drive pattern.

As shown in FIG. 16, when the non-woven fabric of the heat-resistant metal has the inappropriate distribution of pore diameter, the differential pressure before and after the filter exceeds 100 kPa at the driving distance of 80 km. This breaks the particulate filter. The back pressure increases due to clogging of the filter and thereby raises the temperature of the exhaust gas flown into the filter. Unlike the particulate filter of the embodiment, there is no phenomenon that the filter temperature is gradually apart from the temperature of the exhaust gas flown into the filter. When the non-woven fabric of the heat-resistant metal has the small distribution of pore diameter, the filter is clogged with the carbon-containing particulates in the exhaust gas. This leads to insufficient supply of oxygen in the exhaust gas to the collected hydrocarbon compounds, and there are no exothermic reactions of the hydrocarbon compounds with oxygen. When the non-woven fabric has the appropriate dimensions as in the particulate filter of the embodiment, on the other hand, oxygen in the exhaust gas is sufficiently supplied to the collected carbon-containing particulates and hydrocarbon compounds to keep the exothermic reactions of the hydrocarbon compounds with oxygen even in the exhaust gas of the relatively low temperature. With the progress of the reactions, the reaction heat or the active species produced through the reaction are accumulated to start combustion of the collected carbon-containing particulates and attain the spontaneous regenerating function.

B-3. Estimated Mechanism of Spontaneous Regenerating Function

The mechanism of the phenomenon occurring in the particulate filter 100 of the embodiment, that is, the phenomenon that the carbon-containing particulates collected on the filter start combustion even in the exhaust gas of the lower temperature than the combustible temperature, has not yet been fully elucidated. The following regards the estimated mechanism of this spontaneous regenerating function.

Figure 17:
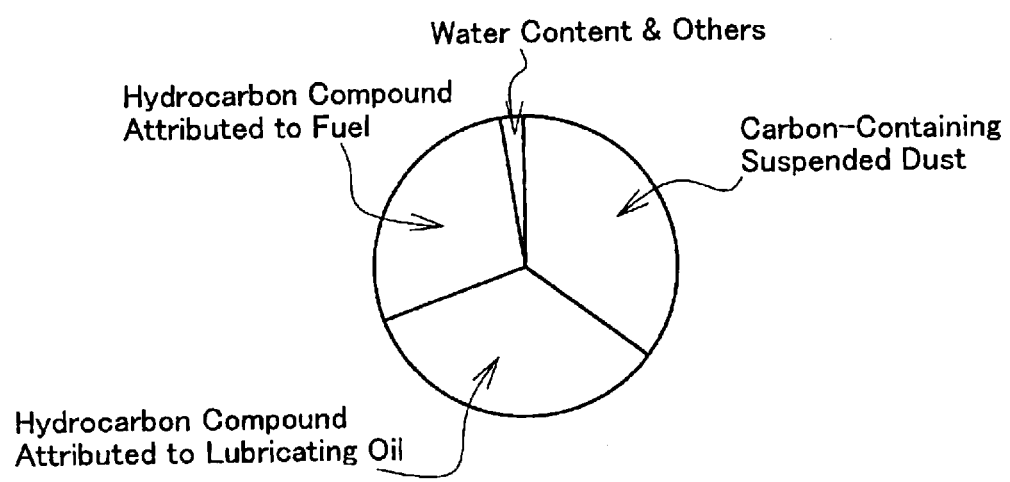
FIG. 17 shows the composition of an exhaust gas of a Diesel engine including carbon-containing particulates and hydrocarbons.

As is known, the exhaust gas from the Diesel engine includes the carbon-containing particulates and the hydrocarbon compounds at a ratio shown in FIG. 17. Roughly speaking, the exhaust gas includes practically similar fractions of the carbon-containing particulates, the fuel-attributed hydrocarbon compounds, and the lubricant oil-attributed hydrocarbon compounds. The carbon-containing particulates like soot are not subjected to combustion at temperatures of lower than 550° C. even in the atmosphere of the oxygen-containing exhaust gas. It is expected, on the other hand, that the fuel-attributed hydrocarbon compounds and the lubricant oil-attributed hydrocarbon compounds are subjected to the oxidation reaction even at temperature of lower than 550° C. under the condition of a sufficient supply of oxygen.

The phenomenon that the carbon-containing particulates collected on the non-woven fabric of the heat-resistant metal start combustion even in the exhaust gas of the lower temperature than the combustible temperature of the carbon-containing particulates does not occur in the case of the non-woven fabric having an inappropriate pore diameter or in the case of a conventionally used ceramic honeycomb filter. As described previously, this phenomenon occurs when the non-woven fabric having the dimensions in the predetermined range is used to collect the carbon-containing particulates and the hydrocarbon compounds in a dispersive manner that brings the respective particulates and hydrocarbon compounds in contact with oxygen included in the exhaust gas. The estimated mechanism of how the non-woven fabric of the embodiment collects the carbon-containing particulates in a dispersive manner will be discussed later.

There is also a variation in temperature of the non-woven fabric. When collection of the carbon-containing particulates and the hydrocarbon compounds continues for a certain time period at temperatures lower than the combustible temperature of the carbon-containing particulates, the temperature of the non-woven fabric gradually increases and eventually reaches 550° C., that is, the combustible temperature of the carbon-containing particulates.

It is accordingly assumed that the following phenomenon occurs on the non-woven fabric when the particulate filter 100 exerts its spontaneous regenerating function. The carbon-containing particulates and the hydrocarbon compounds in the exhaust gas are collected dispersedly in the non-woven fabric. The temperature of the exhaust gas flown into the filter is lower than the combustible temperature of the carbon-containing particulates. The collected particulates do not thus immediately start combustion, while the hydrocarbon compounds start some reaction with oxygen in the exhaust gas. Since the filter temperature gradually rises, this reaction is regarded as a gentle exothermic reaction. When this exothermic reaction continues for a while, the reaction heat is accumulated or the active species produced through the reaction are accumulated to start combustion of the carbon-containing particulates.

In the case of the cordierite honeycomb filter or the non-woven fabric having an inappropriate pore diameter or another dimension, it is difficult to collect the carbon-containing particulates and the hydrocarbon compounds in a highly dispersive manner to bring the respective particulates and hydrocarbon compounds in contact with oxygen in the exhaust gas. This leads to an insufficient supply of oxygen, and the gentle exothermic reaction of the hydrocarbon compounds with oxygen in the exhaust gas does not proceed. The reaction heat or the active species produced through the reaction are thus not accumulated. These filters accordingly do not exert the spontaneous regenerating function, which is found in the particulate filter of the embodiment.

The higher temperature of the exhaust gas flown into the filter causes the filter temperature to readily reach the combustible temperature of the carbon-containing particulates. Intuitively it is thought that this leads to easy combustion of the collected carbon-containing particulates. In the actual state, however, the excessively high temperature of the exhaust gas flown into the filter may interfere with the exertion of the spontaneous regenerating function and the resulting combustion of the carbon-containing particulates. This may be ascribed to that the high temperature of the exhaust gas changes the path of the reaction of the hydrocarbon compounds with oxygen and thereby prevents accumulation of the active species produced through the reaction.

FIG. 18 conceptually shows simulation of a pre-reaction of a hydrocarbon compound collected on the non-woven fabric with oxygen in the exhaust gas under a temperature condition lower than the combustible temperature of the carbon-containing particulates. Here the collected hydrocarbon compound is butane ($C_4H_{10}$), and the chemical reaction of the butane molecule with oxygen is simulated by computational chemistry. A diversity of techniques have been proposed for computational chemistry. The technique adopted here is a semi-experimental technique that uses experimental data for the parts having difficulty in computation and solves a wave equation representing the electron orbit of the molecule to trace the chemical reaction.

Figure 18A:
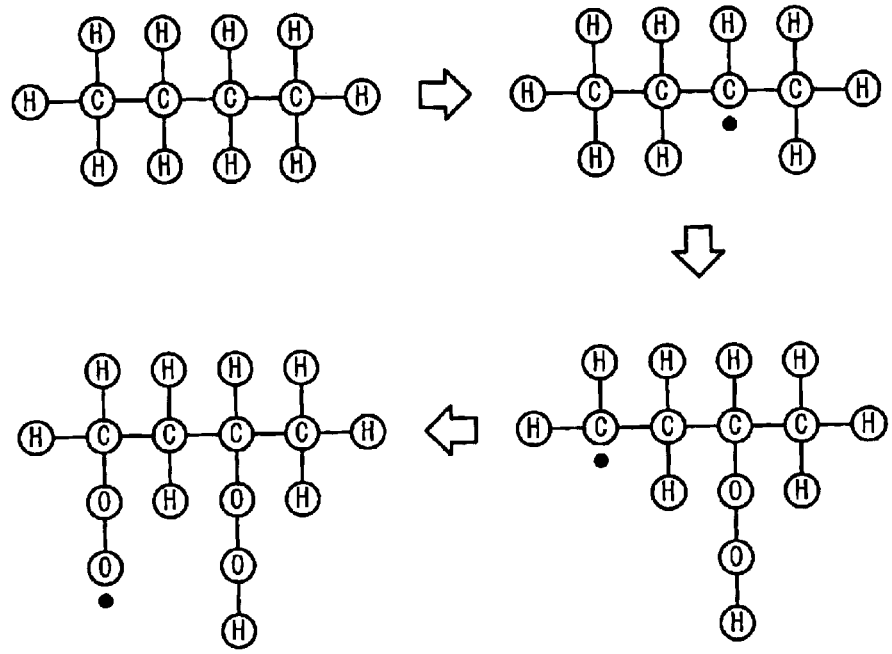
FIG. 18 conceptually shows a process of producing active species through a gentle oxidation reaction of a hydrocarbon with oxygen under a temperature condition lower than the combustible temperature of soot.

According to the results of the computation, one hydrogen atom flies out of the butane molecule to start the reaction as shown in FIG. 18(a). The butane molecule loosing one hydrogen atom has one unpaired electron, to which oxygen in the exhaust gas is bonded. The small closed circle in the drawing represents the place of the unpaired electron. Oxygen extracts one hydrogen atom from a different place when being bonded to the butane molecule. There is accordingly a new unpaired electron at the position of the extracted hydrogen atom. Oxygen in the exhaust gas is also bonded to the position of the new unpaired electron. The butane molecule is gradually bonded to oxygen in the exhaust gas in this manner to produce a partly oxidized active species. This oxidation reaction is exothermic. As the reaction proceeds, the temperature rises and the partly oxidized active species is accumulated.

Figure 18B:
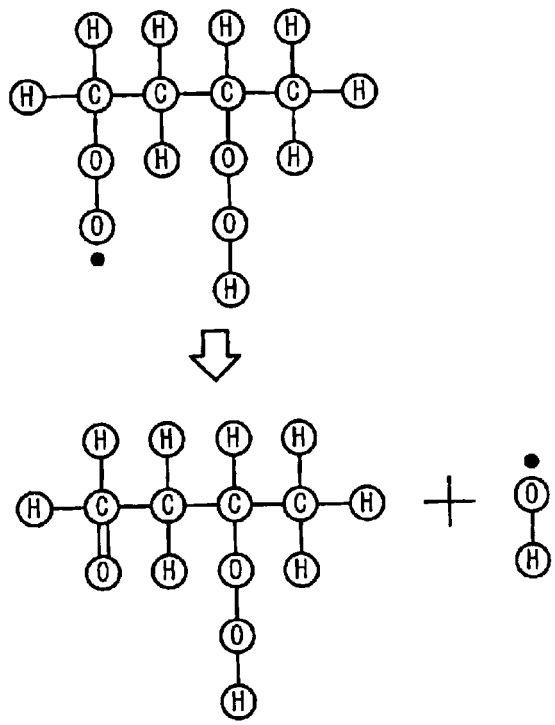

As the reaction in the first stage proceeds, the temperature rises and the partly oxidized active species is accumulated. The reaction then goes to a second stage, where an OH radical is produced from the active species obtained by partial oxidation of the butane molecule as shown in FIG. 18(b). The OH radical is highly reactive and causes abrupt combustion of the remaining hydrocarbon compounds and carbon-containing particulates.

Figure 27A:
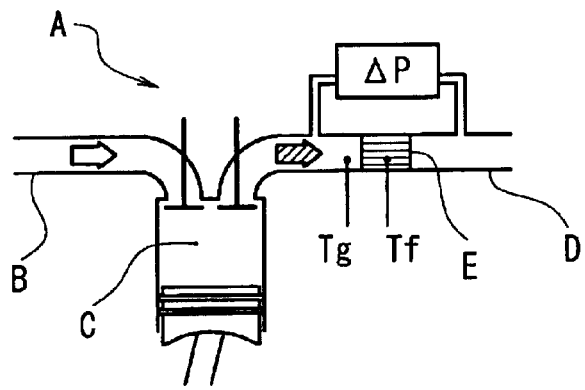
FIG. 27 conceptually shows spontaneous regenerating function of the particulate filter of the embodiment.
Figure 27B:
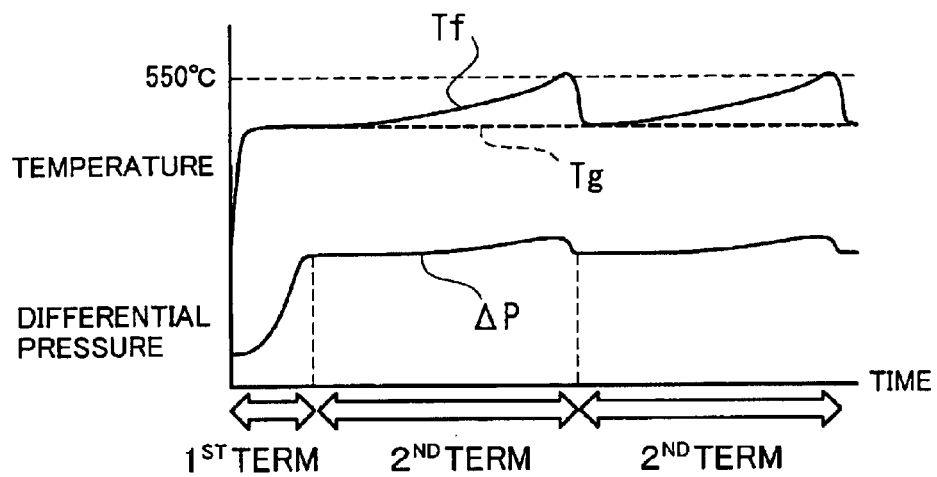
Figure 27C:
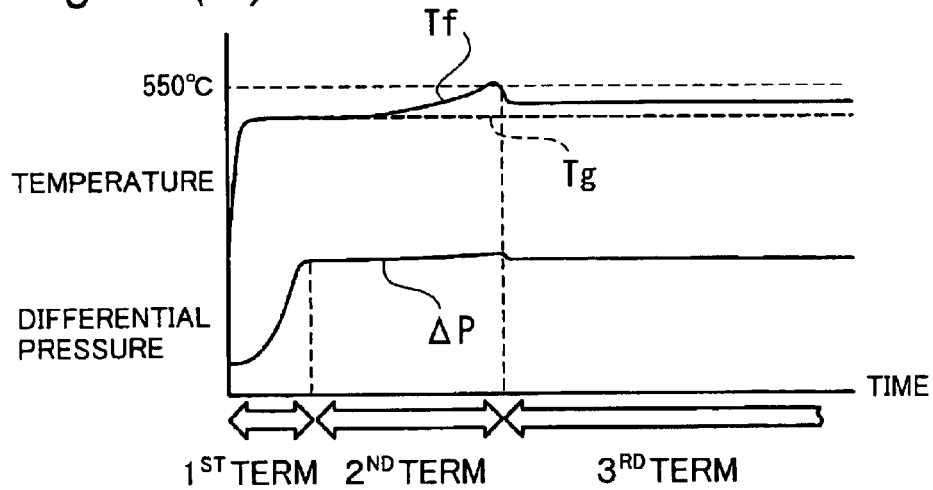

According to the results of the computation, sufficient accumulation of the partially oxidized active species in the first stage of the reaction leads to production of a greater quantity of the OH radical in the second stage of the reaction, thus causing abrupt combustion of the remaining hydrocarbon compounds and carbon-containing particulates. A hydrocarbon compound containing a greater number of carbon atoms than the butane molecule enables a greater number of oxygen atoms to be bonded to one molecule. This leads to production of a greater quantity of the OH radical for the abrupt combustion. In the second term shown in FIG. 27 described previously, the hydrocarbon compounds and oxygen included in the exhaust gas undergo reactions as shown in FIG. 18 on the particulate filter. When the reaction heat or the active species produced through the reaction are sufficiently accumulated, the carbon-containing particulates collected on the filter start combustion.

B-4. Collection Model

As described above, the particulate filter 100 of the embodiment is composed of the non-woven fabric having the predetermined dimensions and is thus capable of dispersedly collecting the carbon-containing particulates and the hydrocarbon compounds in the exhaust gas. The mechanism discussed below is estimated to actively take and collect the particulates like soot in the non-woven fabric. The estimated collection mechanism is briefly described below.

FIG. 19 conceptually shows the cross sectional structure of a non-woven fabric of a heat-resistant metal. The hatched circles in the drawing respectively represent the cross sections of fibers of the non-woven fabric. The non-woven fabric is composed of numerous fibers tangled intricately and has numerous three-dimensional pathways connecting with one another in a complicated manner.

Figure 19A:
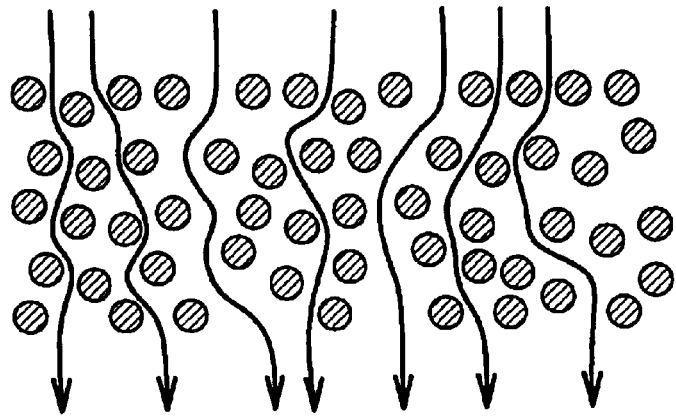
FIG. 19 conceptually shows a mechanism of dispersedly collecting soot and other particulates included in the exhaust gas by means of the particulate filter of the embodiment.

FIG. 19(a) conceptually shows the cross sectional structure of a new non-woven fabric. It is here assumed that the exhaust gas flows down. Because of the variation in distribution of fibers, opening of various sizes are formed on the surface of the non-woven fabric. Even the small opening is sufficiently large for the gas molecules in the exhaust gas. The flow of the exhaust gas thus passes through the whole surface of the non-woven fabric in a practically uniform manner. In the drawing of FIG. 19(a), the flows of the exhaust gas between the fibers of the non-woven fabric are schematically expressed by the thick arrows.

Figure 19B:
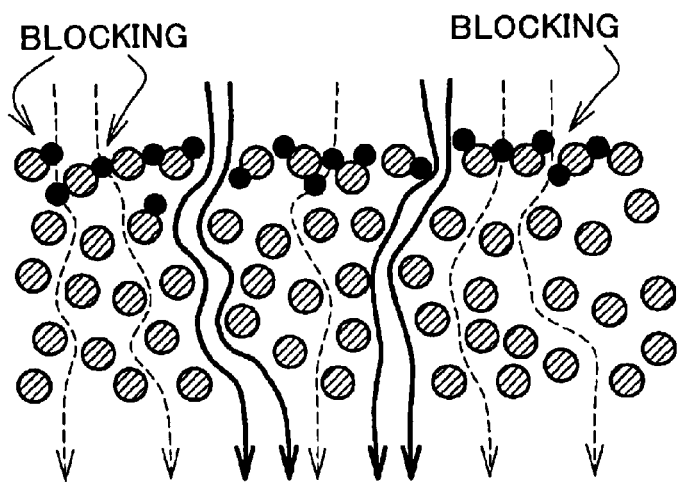

As the flow of the exhaust gas passes through the non-woven fabric, the particulates like soot included in the exhaust gas are trapped between the fibers and gradually clog the openings on the surface of the non-woven fabric. The small openings on the surface of the non-woven fabric are clogged with the particulates like soot, and the flows of the exhaust gas go to the non-clogged but remaining, relatively large openings as shown in FIG. 19(b). The flows of the exhaust gas passing through the non-woven fabric accordingly meet together to the flows from the non-clogged but remaining, relatively large openings on the surface. In the drawing of FIG. 19(b), the particulates like soot are schematically expressed by the small closed circles.

The integrated flow of the exhaust gas increases the flow velocity and causes a significant pressure gradient in the pathway. This phenomenon may be compared to the collision of the flow against the fibers of the non-woven fabric to produce a large pressure. As mentioned previously, the pathways formed inside the non-woven fabric communicate with one another in a complicated manner. The higher pressure of the integrated flow in the pathway causes the flow to immediately branch off to the other pathways. The differential pressure before and after the non-woven fabric thus does not increase to or above a preset level but is kept in a fixed range.

Figure 19C:
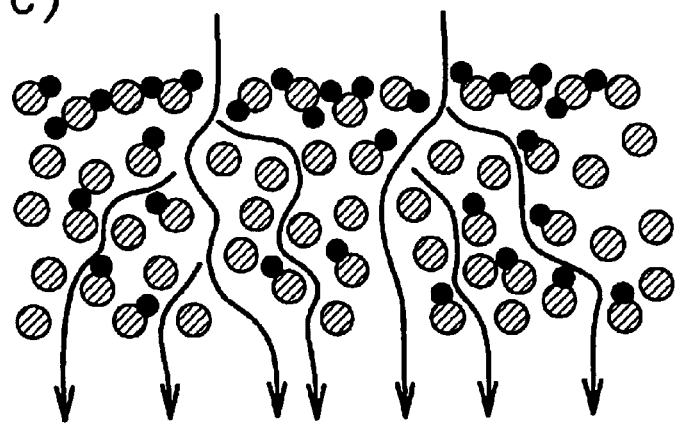

FIG. 19(c) conceptually shows the main stream branching off to the other pathways. As the flow of the exhaust gas branches off in the non-woven fabric, the carbon-containing particulates like soot included in the exhaust gas are collected by the whole area of the non-woven fabric. Even if a certain place in the non-woven fabric is clogged with soot, the three-dimensional connection of the pathways allows the flow to immediately branch off to the other pathways. Namely even when a certain place in the non-woven fabric is clogged with soot and the other particulates, the flow path of the exhaust gas is automatically changed to new pathways. This arrangement ensures dispersed collection of the soot and the other particulates.

As described above, the particulate filter 100 of the embodiment is used for collection of the carbon-containing particulates like soot included in the exhaust gas and spontaneous combustion of the collected soot and other particulates. This arrangement easily regulates and reduces the carbon-containing particulates included in the exhaust gas without any special control.

Since the collected carbon-containing particulates spontaneously start combustion, no labor-consuming treatment is required to estimate the collection state of the soot and start combustion. This arrangement ensures the effective regulation and reduction of the carbon-containing particulates in the exhaust gas.

The collected carbon-containing particulates like soot and hydrocarbon compounds spontaneously start combustion, so that there is no possibility of clogging and breaking the filter.

Simple attachment of the particulate filter of the embodiment into the exhaust pipe of the conventional internal combustion engine gives the extremely simple but highly reliable emission control system. The simple attachment of the particulate filter also significantly reduces the manufacturing cost of the emission control system.

B-5. Desired Dimension Ranges of Non-woven Fabric

As described previously, the particulate filter 100 of the embodiment collects the carbon-containing particulates and the hydrocarbon compounds in the exhaust gas in a dispersive manner that brings the respective particulates and hydrocarbon compounds in contact with oxygen in the exhaust gas. This allows combustion of the collected particulates in the exhaust gas of the lower temperature than the combustible temperature of the carbon-containing particulates. This phenomenon is not observed in the case of the metal non-woven fabric having the small pore diameter or the cordierite honeycomb filter as described above. For successful exertion of the spontaneous regenerating function, the dimensions of the non-woven fabric should be in a preset range. Further systematic experiments are required to specify the preset range. According to the results of the experiments performed so far, it is at least preferable that the mean inner diameter of the pores formed inside the non-woven fabric is in a range of approximately 5 $\mu$m to approximately 25 $\mu$m. The reason of such specification is discussed below.

As described above with reference to FIG. 19, in the particulate filter 100 of the embodiment, the flow path of the exhaust gas is automatically changed in the non-woven fabric to dispersedly collect the carbon-containing particulates and the hydrocarbon compounds. In order to allow the change of the flow path of the exhaust gas, the non-clogged large openings should be present at a certain ratio to the openings formed by the pores on the surface of the non-woven fabric, while the small openings are clogged with the collected carbon-containing particulates (see FIGS. 19(*b*) and 19(*c*)). Since the large openings should be present at a certain ratio, the mean pore diameter of the non-woven fabric is required to be greater than a preset value. In the test with a non-woven fabric having the mean pore diameter of 5 $\mu$m, the particulate filter was soon clogged. It is accordingly preferable that the mean pore diameter of the non-woven fabric is greater than about 5 $\mu$m. The test results shown in FIG. 16 support such specification.

When the non-woven fabric has an extremely large mean pore diameter, on the contrary, the openings on the surface of the non-woven fabric are hardly clogged. The flow path of the exhaust gas is thus not changed in the non-woven fabric. This proves that the mean pore diameter of the non-woven fabric should be smaller than a preset value. In the test with a non-woven fabric having the mean pore diameter of 25 $\mu$m, unlike the particulate filter of the embodiment, no spontaneous regenerating function was observed. It is accordingly preferable that the mean pore diameter is smaller than about 25 $\mu$m.

In the specification hereof, the mean pore diameter represents the mean value of the pore diameter measured according to the Washburn's equation. When the filter is soaked in a liquid, the smaller pore diameter enhances the possibility of clogging the pores by the surface tension of the liquid and thereby increases the air-flow resistance of the filter. The Washburn's equation notes this phenomenon and specifies the relation of the differential pressure before and after the filter with the surface tension of a liquid, the contact angle of the liquid with the filter, and the pore diameter of the filter. The measurement according to the Washburn's equation is widely used to obtain the distribution of pore diameter and is not specifically described here. Namely the mean pore diameter is the pore diameter having the accumulated pore volume of 50% measured according to the Washburn's equation. The numerical value of the mean pore diameter is varied in measurement of another known method.

From the viewpoint of the durability of the particulate filter 100, the mean pore diameter of the non-woven fabric is preferably in a range of about 11 $\mu$m to about 13 $\mu$m. The following describes the reason of such specification.

Deterioration of the particulate filter 100 may be caused by accumulation of the particulates, called ash, on the filter. Metal components like Ca, G, and Zn included in additives of engine oil are combined with sulfur in the fuel to form sulfates. The sulfates deposit as the ash. The metal sulfates are thermally stable. The ash accumulated on the filter is not subjected to combustion unlike the carbon-containing particulates, but clogs the particulate filter 100. With a view to evaluating the durability to the ash, the durability test of various particulate filters having different mean pore diameters was performed with a Diesel engine having the intentionally increased quantity of ash. More specifically, the spontaneous regenerating function was evaluated after 20-hour duration under the total loading condition with an engine having the 5-fold consumption of engine oil.

FIG. 20 shows the summary of the test results. The test evaluated three particulate filters of non-woven fabrics having the mean pore diameter of 10 $\mu$m, 12 $\mu$m, and 14 $\mu$m. Any of the new particulate filters has the spontaneous regenerating function. The 'double circle' in FIG. 20 shows that the favorable spontaneous regenerating function has been observed. The particulate filter having the mean pore diameter of 12 $\mu$m had the favorable spontaneous regenerating function even after the duration test. Both the filter having the mean pore diameter of 10 $\mu$m and the filter having the mean pore diameter of 14 $\mu$m were, on the other hand, clogged in the course of the duration test and broken during the evaluation. The spontaneous regenerating function was accordingly not observable in either case.

After the duration test, the non-woven fabric of each filter was observed with an optical microscope. In the non-woven fabric having the mean pore diameter of 10 $\mu$m, the fibers were still observable on the outflow surface of the exhaust gas (the surface at the outlet), whereas the fibers were hardly observable on the inflow surface of the exhaust gas (the surface at the inlet) that was clogged with ash and had accumulation of the carbon-containing particulates. In the non-woven fabric having the mean pore diameter of 14 μm, on the contrary, the surface at the inlet was not clogged, whereas the openings formed between the fibers on the surface at the outlet were clogged by the ash and the carbon-containing particulates. In the non-woven fabric having the mean pore diameter of 12 μm, the ash adhered to some fibers of the non-woven fabric on both the surface at the inlet and the surface at the outlet. The openings between the fibers were, however, not at all clogged by the ash.

FIG. 21 conceptually shows a variation in clogging state with a variation in mean pore diameter of the non-woven fabric. The drawing shows the cross section of the particulate filter 100 along part of the pathways formed between the non-woven fabric 106 and the corrugated sheet 108 of the particulate filter 100. The exhaust gas is flown from the left side of the drawing into the filter, passes through the non-woven fabric 106 as shown by the arrows, and goes to the right side of the drawing. The filled parts schematically represent accumulation of the ash and the carbon-containing particulates on the surface of the non-woven fabric.

Figure 21A:
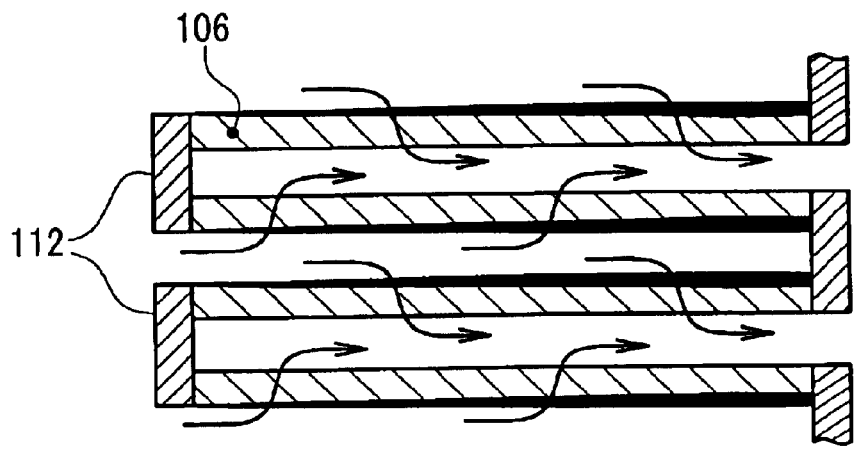
FIG. 21 conceptually shows a variation in clogging state with a variation in mean pore diameter of the non-woven fabric.
Figure 21B:
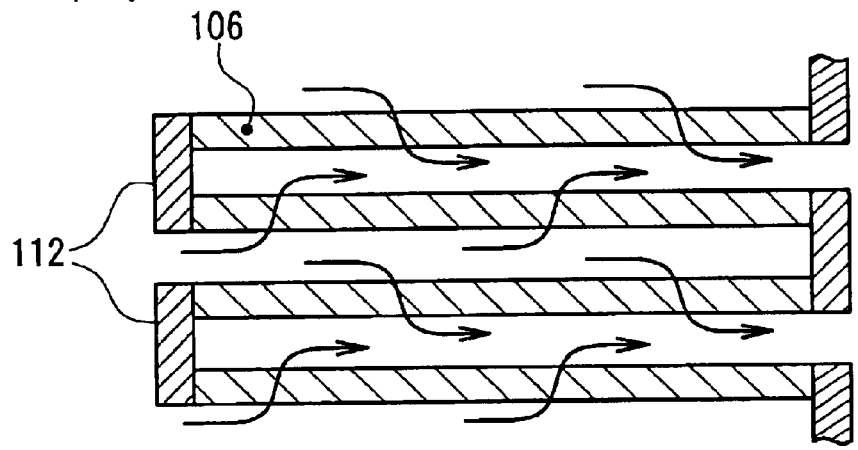
Figure 21C:
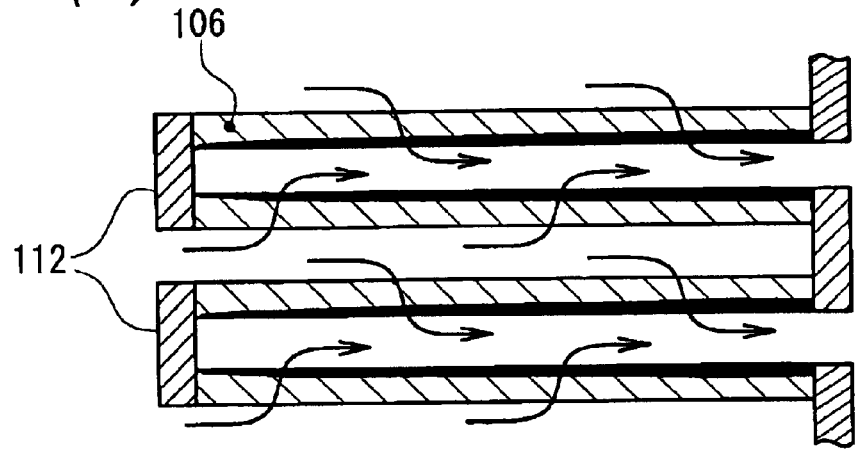

FIG. 21(a) shows the particulate filter having the mean pore diameter of 10 μm. In the case of the non-woven fabric having the mean pore diameter of 10 μm, the ash and the carbon-containing particulates are locally accumulated on the surface of the non-woven fabric at the inlet, that is, on the inflow surface of the exhaust gas to clog the pores of the non-woven fabric. FIG. 21(b) shows the particulate filter having the mean pore diameter of 12 μm. In the case of the non-woven fabric having the mean pore diameter of 12 μm, the ash is evenly dispersed over the whole surface of the non-woven fabric, while the spontaneous regenerating function causes combustion of the carbon-containing particulates. The carbon-containing particulates are thus not accumulated to any significant depth and do not clog the pores. FIG. 21(c) shows the particulate filter having the mean pore diameter of 14 μm. In the case of the non-woven fabric having the mean pore diameter of 14 μm, the ash and the carbon-containing particulates are not accumulated to any significant depot on the surface at the inlet, but are locally accumulated on the surface at the outlet, that is, the outflow surface of the exhaust gas, to clog the pores of the non-woven fabric.

The greater mean pore diameter of the non-woven fabric leads to localization and accumulation of the ash and the carbon-containing particulates on the surface of the non-woven fabric at the outlet. This may be ascribed to the fact that the greater pore diameter makes it more difficult to change over the flow path of the exhaust gas passing through the non-woven fabric. As discussed previously with reference to FIG. 19, the particulate filter 100 of the embodiment dispersedly collects the carbon-containing particulates by changing over the flow path of the exhaust gas in the non-woven fabric. When the non-woven fabric has a large mean pore diameter, the carbon-containing particulates and the ash are not collected on the surface of the non-woven fabric at the inlet. No changeover of the flow path of the exhaust gas, however, results in localization and accumulation of the ash and the carbon-containing particulates in the vicinity of the outlet.

As described above, when the mean pore diameter of the non-woven fabric is not greater than 10 μm, the ash and the carbon-containing particulates may accumulate on the surface of the non-woven fabric at the inlet to clog the particulate filter after the long-time use. When the mean pore diameter of the non-woven fabric is not less than 14 μm, on the other hand, the ash and the carbon-containing particulates may accumulate on the surface of the non-woven fabric at the outlet to clog the particulate filter after the long-time use. It is accordingly preferable that the non-woven fabric of the particulate filter has the mean pore diameter in the range of about 11 μm to 13 μm. Some experiments showed the best results when the non-woven fabric had the mean pore diameter of 12 μm±10%.

The above description regards the mean pore diameter of the non-woven fabric. Setting the pore diameter of the non-woven fabric in the above range automatically specifies the desirable range of the fiber diameter of the non-woven fabric. The greater pore diameter lowers the fiber density in the non-woven fabric. The less fiber density lowers the strength of the non-woven fabric. In order to compensate for the lowered strength due to the less fiber density, each fiber should have the greater diameter. To ensure the sufficient strength of the non-woven fabric, the greater pore diameter leads to the greater fiber diameter. It is also empirically known that the factors on manufacture of the non-woven fabric often cause the fiber diameter to increase with an increase in pore diameter. Because of these reasons, it is desirable that the fiber diameter is not less than about 15 μm and not greater than about 20 μm to attain the mean pore diameter of the non-woven fabric in the range of about 11 μm to 13 μm.

C. Modifications

The emission control device discussed above may be modified in various ways. FIG. 22 shows modified examples of the attachment structure of the particulate filter 100. The following describes these modified examples.

(1) First Modified Example

Figure 22A:
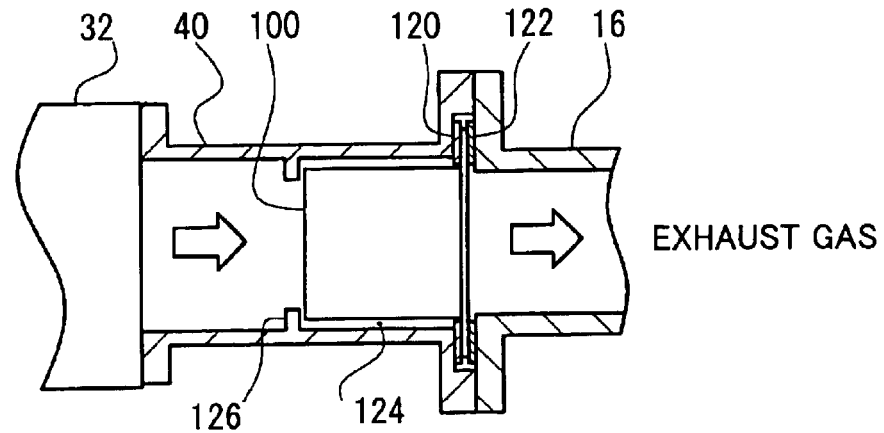
FIG. 22 shows diverse attachment structures of the particulate filter as modified examples.

FIG. 22(a) shows an attachment structure of a first modified example. In the first modified example, a projection 126 is formed on the inner circumferential face of the filter holder 40 at a position corresponding to the inlet to the gap 124. The projection 126 formed on the inner circumferential face of the filter holder 40 intercepts the flow of the exhaust gas and prevents the direct flow of the exhaust gas into the gap 124. The arrangement thus restricts the flow of the exhaust gas inside the gap 124. This decreases the quantity of heat transmission to the filter holder 40 and thereby keeps the particulate filter 100 at sufficiently high temperature.

(2) Second Modified Example

Figure 22B:
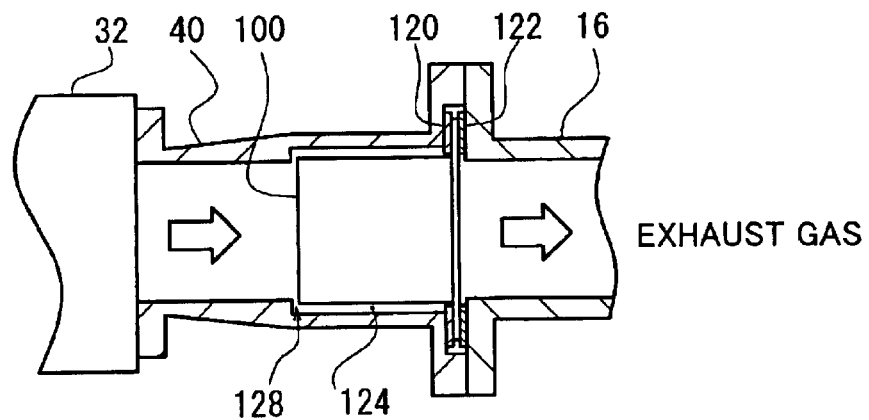

FIG. 22(b) shows an attachment structure of a second modified example. In the second modified example, a step is formed on the inner circumferential face of the filter holder 40 to interfere with the direct flow of the exhaust gas into the gap 124. This arrangement thus restricts the flow of the exhaust gas inside the gap 124.

In the second modified example, the step formed on the inner circumferential face of the filter holder 40 is close to the end of the particulate filter 100. A restriction 128 is accordingly provided between the end of the filter and the step. The restriction 128 functions to interfere with the inflow of the exhaust gas and restricts the flow of the exhaust gas inside the gap 124. This decreases the quantity of heat transmission to the filter holder 40 and thereby keeps the particulate filter 100 at sufficiently high temperature.

(3) Third Modified Example

Figure 22C:
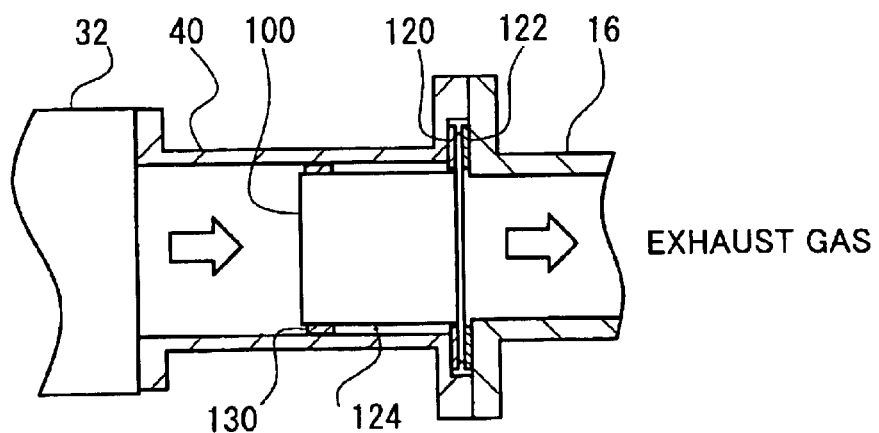

FIG. 22(c) shows an attachment structure of a third modified example. In the third modified example, a heat insulating member 130 is set on the outer circumference at the end of the particulate filter 100. The gap 124 is defined behind the heat insulating member 130 in attachment of the particulate filter 100. In the attachment structure of the third modified example, the heat insulating member 130 intercepts the flow of the exhaust gas into the gap 124 and thus keeps the particulate filter 100 at high temperature.

In the structure of the third modified example, the heat insulating member 130 guides the particulate filter 100 and keeps the particulate filter 100 apart from the filter holder 40 at a fixed interval. This advantageously facilitates attachment of the filter.

In the structure of the third modified example, the heat insulating member 130 is disposed only on the outer circumference at the end of the particulate filter 100. The heat insulating member 130 may otherwise be set over the whole outer circumference.

(4) Fourth Modified Example

Figure 23:
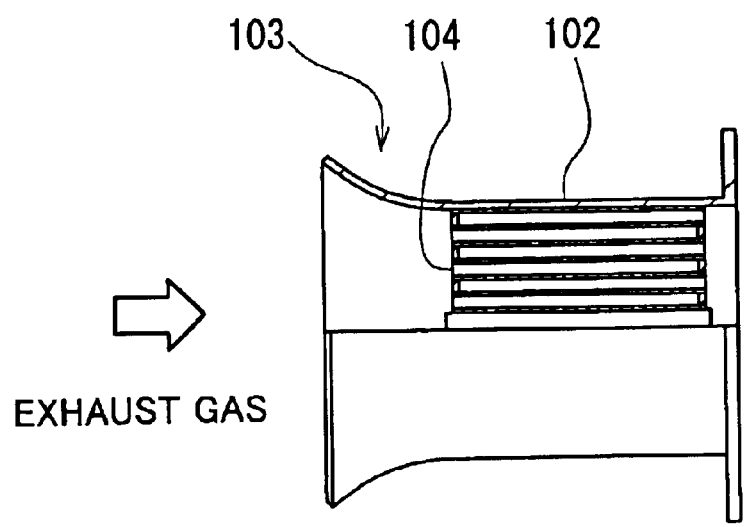
FIG. 23 schematically illustrates the structure of a particulate filter in a fourth modified example.

The particulate filter 100 of a modified structure may be applied for the emission control device of the embodiment. FIG. 23 schematically shows the structure of the particulate filter 100 used in a fourth modified example. For better understanding, the cross section of the particulate filter 100 is partly illustrated in FIG. 23. The particulate filter 100 of the fourth modified example has a guide element 103 on the case 102. The guide element 103 leads the flow of the exhaust gas into the particulate filter 100. This arrangement enables the filter temperature to be efficiently raised by effectively utilizing the dynamic pressure of the exhaust gas.

In the structure of the fourth modified example, the guide element 103 is provided on the case 102 of the particulate filter 100 and is apart from the filter holder 40 via the gap 124. Part of the thermal energy of the exhaust gas may be transferred to the guide element 103, when the exhaust gas is led by the guide element 103 and is flown into the particulate filter 100. This arrangement prevents the transferred thermal energy from being released to the filter holder 40 but causes the thermal energy to be used to raise the filter temperature, thus keeping the particulate filter 100 at high temperature.

(5) Fifth Modified Example

Figure 24:
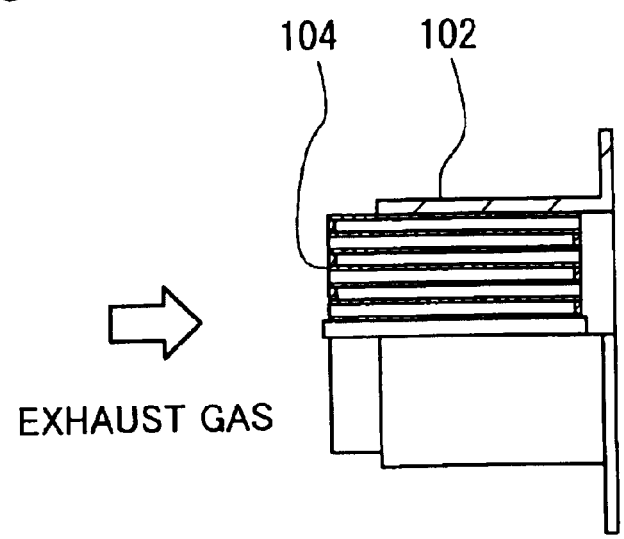
FIG. 24 schematically illustrates the structure of a particulate filter in a fifth modified example.

FIG. 24 schematically shows the structure of the particulate filter 100 used in a fifth modified example. For better understanding, the cross section of the particulate filter 100 is partly illustrated in FIG. 24. In the particulate filter 100 of the fifth modified example, the end of the element 104 is extended from the case 102. This arrangement prevents release of heat from the filter to the case 102 at the end in the process of converting the dynamic pressure of the exhaust gas into heat and thus ensures a quick temperature rise at the end of the filter. The temperature gradient inside the filter enables the end of the filter to be kept at higher temperature than the temperature of the other part of the filter.

(6) Sixth Modified Example

Figure 25:
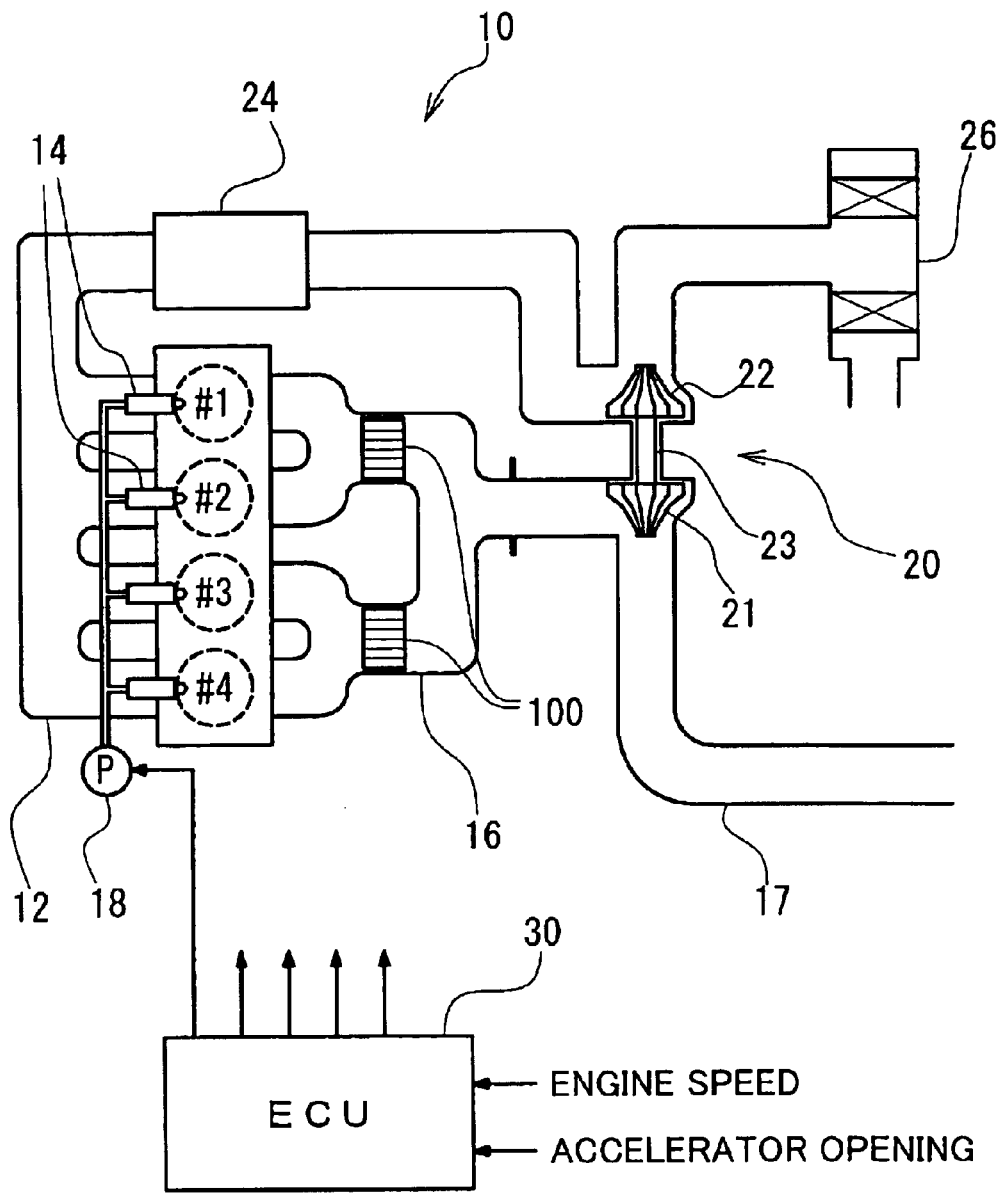
FIG. 25 shows another emission control system in a sixth modified example.

In the structures of the embodiment and modified examples discussed above, the particulate filter 100 is provided for each combustion chamber. It is, however, not essential to provide the particulate filter 100 for each combustion chamber. In one possible modification, the flow of the exhaust gas from multiple combustion chambers is gathered to a joint flow, and the particulate filter is disposed at the joint. In an example shown in FIG. 25, the flow of the exhaust gas from every two or three cylinders is gathered to a joint flow, and the particulate filter is disposed at each joint. There may be not a sufficient space for setting the filter in the vicinity of the combustion chamber. It is relatively easy to find the sufficient space at the joint. This arrangement thus allows the particulate filter 100 to have a greater size or an optimum shape.

(7) Seventh Modified Example

In any of the embodiment and modified examples discussed above, the particulate filter 100 may be combined with a NOx reduction catalyst or another catalyst. This application is discussed below as a seventh modified example.

Figure 26:
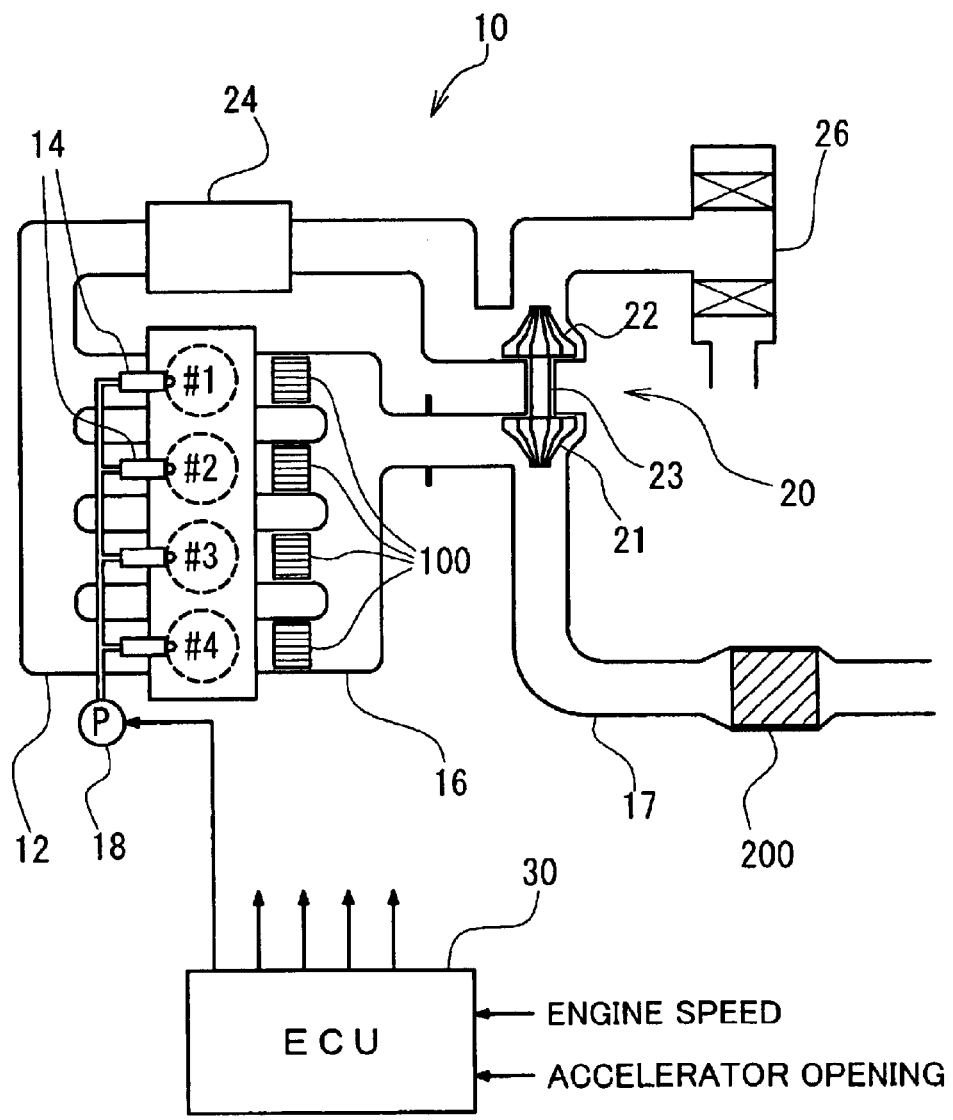
FIG. 26 shows still another emission control system in a seventh modified example.

FIG. 26 illustrates an emission control system of the seventh modified example where the particulate filter 100 of the embodiment is combined with a NOx absorbing reduction-type three-way catalyst 200. The NOx absorbing reduction-type three-way catalyst 200 absorbs nitrogen oxides in the exhaust gas under the condition that excess oxygen is present in the exhaust gas, and starts reduction of the absorbed nitrogen oxides with the hydrocarbon compounds and carbon monoxide included in the exhaust gas with a decrease in concentration of oxygen in the exhaust gas. The iterative absorption and reduction of the nitrogen oxides effectively regulates and diminishes the nitrogen oxides in the exhaust gas.

In the emission control system shown in FIG. 26, the carbon-containing particulates included in the exhaust gas are regulated and diminished in the upstream of the NOx absorbing reduction-type three-way catalyst 200. This arrangement desirably avoids the potential problem of the downstream NOx absorbing reduction-type three-way catalyst 200 that is covered with soot to lower the performances.

The NOx absorbing reduction-type three-way catalyst 200 releases active oxygen in the process of absorbing nitrogen oxides in the exhaust gas or in the process of reducing the absorbed nitrogen oxides. The active oxygen has extremely high reactivity and readily causes combustion of the carbon-containing particulates. The combined use of the NOx absorbing reduction-type three-way catalyst 200 in the downstream of the particulate filter 100 thus ensures regulation and omission of the carbon-containing particulates in the downstream NOx absorbing reduction-type three-way catalyst 200 even when the carbon-containing particulates pass through the particulate filter 100.

In some cases, the particulate filter of the embodiment may be disposed in the downstream of the NOx absorbing reduction-type three-way catalyst 200 to effectively regulate and diminish nitrogen oxides and soot in the exhaust gas. For example, in the case of relatively little emission of the soot but significantly large emission of the nitrogen oxides, the NOx absorbing reduction-type three-way catalyst 200 is disposed in the upstream of the particulate filter. This arrangement feeds the hydrocarbon compounds immediately after the start of reduction of the nitrogen oxides, thus quickly diminishing the nitrogen oxides.

The above embodiment and its modifications are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

For example, in the above embodiment and modified examples, the air may be supplied to the upstream of the particulate filter 100 by means of a lead valve or a power-driven pump. The supply of oxygen to the exhaust gas according to the requirements favorably accelerates the reaction of the collected hydrocarbon compounds with oxygen.

A metal catalyst having appropriate oxidation activity, such as Fe, Cu, and Co, may be carried on the non-woven fabric. Such a metal catalyst accelerates the reaction of the collected hydrocarbon compounds with oxygen in the low-temperature exhaust gas and favorably ensures combustion of the collected carbon-containing particulates.

In the structures of the above embodiment and modified examples, the particulate filter is attached by means of the filter holder 40. The particulate filter may, however, be directly inserted into and fixed to the exhaust port of the cylinder head without using the filter holder 40. The particulate filter may otherwise be inserted into and fixed to the downstream exhaust manifold 16.

Industrial Applicability

As described above, the emission control device of the present invention ensures easy and secure regulation and reduction of the carbon-containing particulates in the exhaust gas over a long time period without requiring any specific control to raise the temperature of the exhaust gas or using any precious noble metals. The technique of the present invention is thus preferably applied to the emission filters for controlling the emission from various internal combustion engines, the emission control devices with such a filter, as well as internal combustion engines with the emission control device for diverse vehicles and ships and stationary internal combustion engines.

What is claimed is:

1. An emission filter for regulating and reducing carbon-containing particulates included in an exhaust gas from an internal combustion engine, said emission filter comprising:
a heat-resistant filter medium that collects a hydrocarbon compound and the carbon-containing particulates included in the exhaust gas in a dispersive manner to bring the respective particulates and hydrocarbon compound in contact with oxygen included in the exhaust gas, and thereby makes the collected hydrocarbon compound and the collected carbon-containing particulates subjected to combustion with the exhaust gas having a filter inflow temperature lower than a combustible temperature of the carbon-containing particulates without requiring use of catalyzing agents, wherein said heat-resistant filter medium utilizes heat of reaction of the collected hydrocarbon compound with oxygen included in the exhaust gas, so as to make the collected carbon-containing particulates subjected to combustion, said heat-resistant filter medium includes multiple pathways, which connect with one another in a three-dimensional manner inside said heat-resistant filter medium and are open to surface of said heat-resistant filter medium, and the multiple pathways included in said heat-resistant filter medium have a mean inner diameter in a range of 11 $\mu$m to 13 $\mu$m, the subject filter being self-reproducing without heating by a heater.

2. An emission filter in accordance with claim 1, wherein said heat-resistant filter medium utilizes active species produced by the reaction of the collected hydrocarbon compound with oxygen included in the exhaust gas, in addition to the heat of the reaction, so as to make the collected carbon-containing particulates subjected to combustion.

3. An emission filter in accordance with claim 1, wherein said heat-resistant filter medium traps the carbon-containing particulates and the hydrocarbon compound therein.

4. An emission filter in accordance with claim 3, wherein said heat-resistant filter medium utilizes a variation in pressure of the exhaust gas from said internal combustion engine to dispersedly collect the carbon-containing particulates and the hydrocarbon compound.

5. An emission filter in accordance with claim 1, wherein said heat-resistant filter medium converts fluidization energy of the exhaust gas from said internal combustion engine into heat, so as to raise the own temperature of said heat-resistant filter medium.

6. An emission filter in accordance with claim 5, wherein said heat-resistant filter medium is heated by utilizing a temperature rise in the process of compressing the exhaust gas by means of a dynamic pressure.

7. An emission filter in accordance with claim 1, wherein said heat-resistant filter medium is a non-woven fabric made of heat-resistant fibers having a mean fiber diameter in a range of 15 $\mu$m to 20 $\mu$m.

8. An emission filter in accordance with claim 7, wherein said heat-resistant filter medium is a non-woven fabric having a thickness in a range of 0.4 mm to 0.5 mm.

9. An emission filter in accordance with claim 1, wherein said heat-resistant filter medium changes over a flow path of the exhaust gas flowing through the multiple pathways in the course of collecting the carbon-containing particulates and the hydrocarbon compound.

10. An emission filter in accordance with claim 9, wherein said heat-resistant filter medium changes over the flow path of the exhaust gas flowing through the multiple pathways when a pressure loss in the course of the collection reaches three to four times of an initial value.

11. An emission control device that is applied to an internal combustion engine to regulate and reduce carbon-containing particulates included in an exhaust gas, wherein said internal combustion engine comprises a combustion chamber and an exhaust conduit for discharging the exhaust gas from said combustion chamber, said emission control device comprising:
an emission filter that is attached to said exhaust conduit to collect the carbon-containing particulates included in the exhaust gas; and
a heat insulating section that is interposed between said emission filter and said exhaust conduit, such that said heat insulating section is a space formed between said emission filter and said exhaust conduit, wherein said emission filter comprises a heat-resistant filter medium that collects a hydrocarbon compound and the carbon-containing particulates included in the exhaust gas in a dispersive manner to bring the respective particulates and hydrocarbon compound in contact with oxygen included in the exhaust gas, and thereby makes the collected hydrocarbon compound and the collected carbon-containing particulates subjected to combustion, without requiring use of catalyzing agents, with the exhaust gas having a filter inflow temperature lower than a combustible temperature of the carbon-containing particulates, the subject filter being self-reproducing without heating by a heater.

12. An emission control device in accordance with claim 11, wherein said internal combustion engine is provided with a plurality of said combustion chambers and an exhaust manifold that unites flows of the exhaust gas from said plurality of combustion chambers to at least one exhaust pipe, and
said emission filter is disposed in said exhaust manifold.

13. An emission control device in accordance with claim 11, wherein said heat insulating section has one end open to a flow path of the exhaust gas and is narrowed at the opening.

14. An emission control device in accordance with claim 11, wherein said heat insulating section has one end open to a flow path of the exhaust gas and has a thickness of not greater than 1 mm.

15. An emission control device in accordance with claim 11, wherein said emission filter is attached to said exhaust conduit via a heat insulating member.

16. An emission control device in accordance with claim 11, wherein said emission filter has a container to receive said heat-resistant filter medium therein, and said container is provided with a guide element that leads the exhaust gas discharged from said combustion chamber to said heat-resistant filter medium.

17. An emission control device in accordance with claim 11, wherein said emission filter has a container to receive said heat-resistant filter medium therein, and said heat-resistant filter medium is received in said container such that an end of said filter medium is projected toward said combustion chamber.

18. An emission control device in accordance with claim 11, wherein said internal combustion engine comprises a supercharger that utilizes fluidization energy of the exhaust gas to actuate a turbine, so as to supercharge induction air of said internal combustion engine, and said emission filter has a flow resistance that is ½ to ⅔ of a flow resistance of said supercharger on a side of said turbine.

19. An emission control device that is applied to an internal combustion engine to regulate and reduce carbon-containing particulates included in an exhaust gas, where said internal combustion engine comprises a plurality of combustion chambers and unites flows of the exhaust gas from said plurality of combustion chambers to at least one joint, prior to emission, said emission control device comprising:

an emission filter that is disposed at said at least one joint, where the flows of the exhaust gas from said plurality of combustion chambers are united, to collect a hydrocarbon compound and the carbon-containing particulates included in the exhaust gas, wherein said emission filter comprises a heat-resistant filter medium that collects a hydrocarbon compound and the carbon-containing particulates included in the exhaust gas in a dispersive manner to bring the respective particulates and hydrocarbon compound in contact with oxygen included in the exhaust gas, and thereby makes the collected hydrocarbon compound and the collected carbon-containing particulates subjected to combustion with the exhaust gas having a filter inflow temperature lower than a combustible temperature of the carbon-containing particulates, wherein said heat-resistant filter medium utilizes heat of reaction of the collected hydrocarbon compound with oxygen included in the exhaust gas without requiring use of catalyzing agents, so as to make the collected carbon-containing particulates subjected to combustion, the subject filter being self-reproducing without heating by a heater.

20. An emission control device in accordance with claim 19, wherein said internal combustion engine unites flows of the exhaust gas discharged from every two or three combustion chambers to one exhaust port, prior to emission, and said emission filter is disposed at every exhaust port, where the flows of the exhaust gas discharged from every two or three combustion chambers are united.

21. An emission control method that regulates and reduces carbon-containing particulates included in an exhaust gas of an internal combustion engine, said emission control method comprising the steps of:

utilizing a heat-resistant filter medium to collect a hydrocarbon compound and the carbon-containing particulates included in the exhaust gas in a dispersive manner to bring the respective particulates and hydrocarbon compound in contact with oxygen included in the exhaust gas; and making the collected hydrocarbon compound and the collected carbon-containing particulates subjected to combustion with the exhaust gas having a filter inflow temperature lower than a combustible temperature of the carbon-containing particulates, so as to regulate and reduce the carbon-containing particulates, said heat-resistant filter medium utilizing heat of reaction of the collected hydrocarbon compound with oxygen included in the exhaust gas without requiring use of catalyzing agents, so as to make the collected carbon-containing particulates subjected to combustion, the subject filter being self-reproducing without heating by a heater.

22. An emission control method in accordance with claim 21, said emission control method further comprising the step of:

leading a supply of oxygen into the exhaust gas, so as to accelerate a reaction of at least either of the collected hydrocarbon compound and the collected carbon-containing particulates with oxygen.

23. An emission control method in accordance with claim 21, said emission control method further comprising the step of:

arranging a NOx reduction catalyst in downstream of said heat-resistant filter medium to diminish nitrogen oxides included in the exhaust gas.

24. An emission control method in accordance with claim 23, wherein the NOx reduction catalyst is a catalyst that absorbs the nitrogen oxides under a condition that excess oxygen is present in the exhaust gas, and reduces the absorbed nitrogen oxides with a decrease in concentration of oxygen in the exhaust gas, so as to diminish the nitrogen oxides in the exhaust gas.

25. An emission control method that is applied to an internal combustion engine to regulate and reduce carbon-containing particulates included in an exhaust gas, where said internal combustion engine comprises a combustion chamber and an exhaust conduit for discharging the exhaust gas from said combustion chamber, said emission control method comprising the steps of:

disposing an emission filter, which comprises a heat-resistant filter medium, in said exhaust conduit in such a manner that a heat insulating section is formed between said emission filter and said exhaust conduit;

utilizing said heat-resistant filter medium to collect a hydrocarbon compound and the carbon-containing particulates included in the exhaust gas in a dispersive manner to bring the respective particulates and hydrocarbon compound in contact with oxygen included in the exhaust gas; and making the collected hydrocarbon compound and the collected carbon-containing particulates subjected to combustion with the exhaust gas having a filter inflow temperature lower than a combustible temperature of the carbon-containing particulates without requiring use of catalyzing agents, so as to regulate and reduce the carbon-containing particulates, wherein the emission filter is attached to the exhaust conduit via a heat insulating section, so as to prevent the exhaust gas flowing in the exhaust conduit from taking away the heat generated in the filter, the filter being self-reproducing without heating by a heater.

26. An emission filter for regulating and reducing carbon-containing particulates included in an exhaust gas from an internal combustion engine, said emission filter comprising:

a heat-resistant filter medium that collects a hydrocarbon compound and the carbon-containing particulates included in the exhaust gas in a dispersive manner to bring the respective particulates and hydrocarbon compound in contact with oxygen included in the exhaust gas, and thereby makes the collected hydrocarbon compound and the collected carbon-containing particulates subjected to combustion with the exhaust gas having a filter inflow temperature lower than a combustible temperature of the carbon-containing particulates without requiring use of catalyzing agents, wherein said heat-resistant filter medium includes multiple pathways, which connect with one another in a three dimensional maimer inside said filter medium and are open to surface of said filter medium, the multiple pathways included in said heat-resistant filter medium have a mean inner diameter in a range of 11 $\mu$m to 13 $\mu$m, the filter being self-reproducing without heating by a heater.

27. An emission filter for regulating and reducing carbon-containing particulates included in an exhaust gas from an internal combustion engine, said emission filter comprising:

a heat-resistant filter medium that collects a hydrocarbon compound and the carbon-containing particulates included in the exhaust gas in a dispersive manner to bring the respective particulates and hydrocarbon compound in contact with oxygen included in the exhaust gas, and thereby makes the collected hydrocarbon compound and the collected carbon-containing particulates subjected to combustion with the exhaust gas having a filter inflow temperature lower than a combustible temperature of the carbon-containing particulates without requiring use of catalyzing agents, wherein said heat-resistant filter medium includes multiple pathways, which connect with one another in a three dimensional manner inside said filter medium and are open to surface of said filter medium, the multiple pathways included in said heat-resistant filter medium have a mean inner diameter in a range of 11 $\mu$m to 13 $\mu$m, and said heat-resistant filter medium is a nonwoven fabric made of heat-resistant fibers having a mean fiber diameter in a range of 15 $\mu$m to 20 $\mu$m, the subject filter being self-reproducing without heating by a heater.

* * * * *